United States Patent
Liu et al.

(10) Patent No.: US 12,192,884 B2
(45) Date of Patent: Jan. 7, 2025

(54) INFORMATION TRANSMISSION METHOD AND TERMINAL DEVICE

(71) Applicant: VIVO MOBILE COMMUNICATION CO., LTD., Guangdong (CN)

(72) Inventors: Siqi Liu, Guangdong (CN); Zichao Ji, Guangdong (CN); Na Li, Guangdong (CN); Shixiao Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 444 days.

(21) Appl. No.: 17/580,461

(22) Filed: Jan. 20, 2022

(65) Prior Publication Data

US 2022/0150804 A1 May 12, 2022

Related U.S. Application Data

(63) Continuation of application No. PCT/CN2020/102696, filed on Jul. 17, 2020.

(30) Foreign Application Priority Data

Jul. 24, 2019 (CN) .......................... 201910673330.X

(51) Int. Cl.
*H04W 48/12* (2009.01)
*H04W 28/06* (2009.01)
(Continued)

(52) U.S. Cl.
CPC ............ *H04W 48/12* (2013.01); *H04W 28/06* (2013.01); *H04W 72/0446* (2013.01);
(Continued)

(58) Field of Classification Search
CPC ..... H04W 48/12; H04W 72/21; H04W 72/54; H04W 72/0446; H04W 72/0453; H04W 72/1263; H04W 28/06; H04W 92/18
(Continued)

(56) References Cited

U.S. PATENT DOCUMENTS 12,028,167 B2 * 7/2024 Wang ...................... H04W 4/06
2016/0128115 A1 5/2016 Panteleev et al.
(Continued)

FOREIGN PATENT DOCUMENTS

CN 106063152 A 10/2016
CN 106817723 A 6/2017
(Continued)

OTHER PUBLICATIONS

UCI Enhancements for eURLLC, 3GPP TSG-RAN WG1 #97, May 13-17, 2019, p. 1-14, R1-1907282, Qualcomm Incorporated, Reno, Nevada, U.S.A.
(Continued)

*Primary Examiner* — Mong-Thuy T Tran
(74) *Attorney, Agent, or Firm* — IP & T GROUP LLP

(57) ABSTRACT

An information transmission method includes: transmitting first sidelink information and first target information on a target resource, or prohibiting transmission of the first sidelink information and the first target information on a same transmission resource. The first sidelink information is sidelink information corresponding to sidelink transmission between the first terminal device and a second terminal device, the first target information includes uplink information or second sidelink information, and the second sidelink information is sidelink information corresponding to sidelink transmission between the first terminal device and a control node.

20 Claims, 5 Drawing Sheets

Transmit first sidelink information and first target information on a target resource, or prohibit transmission of the first sidelink information and the first target information on a same transmission resource — 301

(51) Int. Cl.
*H04W 72/0446* (2023.01)
*H04W 72/0453* (2023.01)
*H04W 72/1263* (2023.01)
*H04W 72/21* (2023.01)
*H04W 72/54* (2023.01)
*H04W 92/18* (2009.01)

(52) U.S. Cl.
CPC ... *H04W 72/0453* (2013.01); *H04W 72/1263* (2013.01); *H04W 72/21* (2023.01); *H04W 72/54* (2023.01); *H04W 92/18* (2013.01)

(58) Field of Classification Search
USPC .......................................................... 370/329
See application file for complete search history.

(56) References Cited

U.S. PATENT DOCUMENTS

| | | | |
|---|---|---|---|
| 2016/0338094 | A1 | 11/2016 | Faurie et al. |
| 2016/0360541 | A1 | 12/2016 | Kim et al. |
| 2017/0188391 | A1 | 6/2017 | Rajagopal et al. |
| 2017/0367087 | A1 | 12/2017 | Seo |
| 2018/0255532 | A1* | 9/2018 | Li ........................ H04W 88/04 |
| 2019/0132745 | A1* | 5/2019 | Sun .................. H04W 74/0808 |
| 2020/0068609 | A1 | 2/2020 | Wang et al. |
| 2020/0127768 | A1* | 4/2020 | Seo ...................... H04L 5/0055 |
| 2020/0137538 | A1* | 4/2020 | Chen .................... H04W 76/14 |
| 2021/0127364 | A1* | 4/2021 | Panteleev ............ H04L 1/1819 |
| 2021/0136671 | A1* | 5/2021 | Kim ..................... H04W 48/18 |
| 2022/0140958 | A1* | 5/2022 | Zhou .................... H04L 1/1887 370/329 |

FOREIGN PATENT DOCUMENTS

| | | |
|---|---|---|
| CN | 107005828 A | 8/2017 |
| CN | 108810906 A | 11/2018 |
| CN | 109792326 A | 5/2019 |
| EP | 3905566 A1 | 11/2021 |
| WO | 2018/147965 A1 | 8/2018 |
| WO | WO-2021008056 A1 * | 1/2021 ........... H04L 1/1812 |

OTHER PUBLICATIONS

On Resource Allocation for NR V2X Mode 1, 3GPP TSG RAN WG1 #97, May 13-17, 2019, R1-1906935, Samsung, Reno, USA.
On Mode 1 resource allocation in Nr V2X, 3GPP TSG RAN WG1 Meeting #97, May 13-17, 2019, R1-1906315, CATT, Reno, USA.
Discussion on Prioritization between UL TX and V2X SL TX, 3GPP TSG RAN WG2 Meeting #96, Nov. 14-18, 2016, p. 1-3, R2-167929, Huawei, HiSilicon, Reno, USA.
Discussion on mode 1 resource allocation mechanism, 3GPP TSG RAN WG1 Meeting #98bis, Oct. 14-20, 2019, R1-1911419, vivo, Chongqing, China.
Discussion on mode 1 resource allocation mechanism, 3GPP TSG RAN WG1 #97, May 13-17, 2019, R1-1906138, vivo, Reno, USA.
Discussion on mode 1 resource allocation mechanism, 3GPP TSG RAN WG1 #98, Aug. 26-30, 2019, R1-1908149, vivo, Prague, CZ.
Discussion on mode 1 resource allocation mechanism, 3GPP TSG RAN WG1 Meeting #98bis, Oct. 14-20, 2019, R1-1910212, vivo, Chongqing, China.
The First Office Action of Priority Application No. CN 201910673330.X issued by the Chinese Patent Office on Mar. 29, 2021.
The Second Office Action of Priority Application No. CN 201910673330.X issued by the Chinese Patent Office on Sep. 10, 2021.
The Third Office Action of Priority Application No. CN 201910673330.X issued by the Chinese Patent Office on Jan. 6, 2022.
International Search Report and Written Opinion of Priority Application No. PCT/CN2020/102696 issued by the Chinese Patent Office on Oct. 21, 2020.
UCI enhancements for NR URLLC, 3GPP TSG RAN WG1 #96bis, R1-1904628, Xi'an, China, Apr. 8-12, 2019. Source: LG Electronics.

* cited by examiner

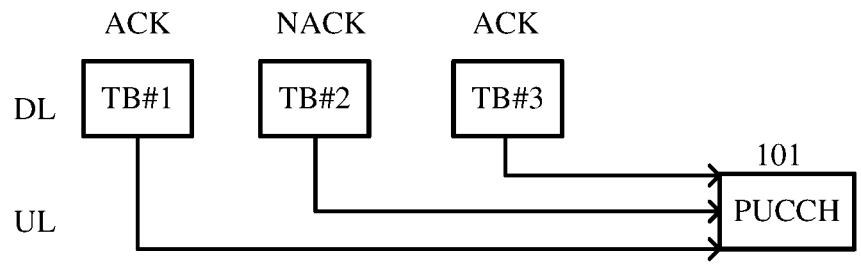
FIG. 1F
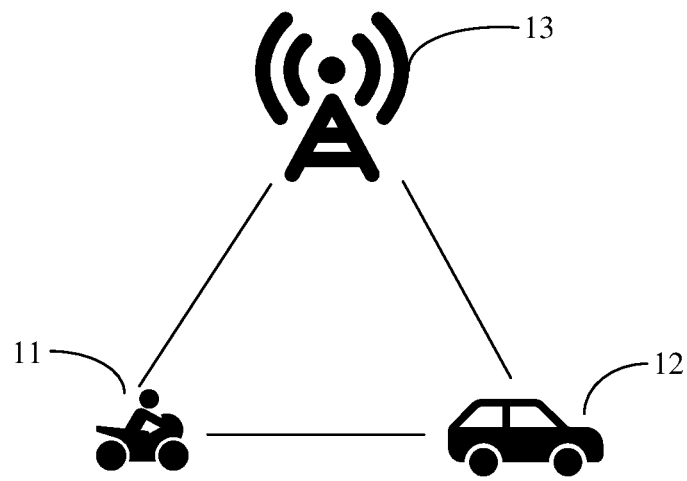
FIG. 2
Transmit first sidelink information and first target information on a target resource, or prohibit transmission of the first sidelink information and the first target information on a same transmission resource — 301
FIG. 3

INFORMATION TRANSMISSION METHOD AND TERMINAL DEVICE

CROSS-REFERENCE TO RELATED APPLICATIONS

This application is a Bypass Continuation Application of PCT/CN2020/102696 filed on Jul. 17, 2020, which claims priority to Chinese Patent Application No. 201910673330.X filed on Jul. 24, 2019, which are incorporated herein by reference in their entirety.

TECHNICAL FIELD

The present disclosure relates to the field of communications technologies, and in particular, to an information transmission method, a terminal device, and a control node.

BACKGROUND

With development of communications technologies, some mobile communications systems support a sidelink, and data may be transmitted between user equipment (UE) (also referred to as a terminal device) based on the foregoing sidelink. However, in the related art, when user equipment needs to simultaneously feed back, to a control node, first sidelink information corresponding to sidelink transmission between the user equipment and another user equipment and feedback information corresponding to transmission (for example, sidelink transmission or uplink transmission) between the user equipment and the control node, no related solution is available for transmitting the first sidelink information and the feedback information to the control node.

SUMMARY

According to a first aspect, the embodiments of the present disclosure provide an information transmission method. The method is applied to a first terminal device and includes:
  transmitting first sidelink information and first target information on a target resource, or prohibiting transmission of the first sidelink information and the first target information on a same transmission resource, where
  the first sidelink information is sidelink information corresponding to sidelink transmission between the first terminal device and a second terminal device, the first target information includes uplink information or second sidelink information, and the second sidelink information is sidelink information corresponding to sidelink transmission between the first terminal device and a control node.

According to a second aspect, the embodiments of the present disclosure provide an information transmission method. The method is applied to a control node and includes:
  receiving first sidelink information and first target information that are transmitted on a target resource, or separately configuring a first resource for the first sidelink information and a second resource for the first target information, where
  the first sidelink information is sidelink information corresponding to sidelink transmission between a first terminal device and a second terminal device, the first target information includes uplink control information, uplink information, or second sidelink information, and the second sidelink information is sidelink information corresponding to sidelink transmission between the first terminal device and the control node; and
  the first resource and the second resource meet a resource configuration rule, and the resource configuration rule includes at least a rule that the first resource and the second resource do not overlap.

According to a third aspect, the embodiments of the present disclosure further provide a terminal device. The terminal device is a first terminal device, and the first terminal device includes:
  a transmission module, configured to transmit first sidelink information and first target information on a target resource, or prohibit transmission of the first sidelink information and the first target information on a same transmission resource, where
  the first sidelink information is sidelink information corresponding to sidelink transmission between the first terminal device and a second terminal device, the first target information includes uplink information or second sidelink information, and the second sidelink information is sidelink information corresponding to sidelink transmission between the first terminal device and a control node.

According to a fourth aspect, the embodiments of the present disclosure further provide a control node. The controller includes:
  a transmission module, configured to receive first sidelink information and first target information that are transmitted on a target resource, or separately configuring a first resource for the first sidelink information and a second resource for the first target information, where
  the first sidelink information is sidelink information corresponding to sidelink transmission between a first terminal device and a second terminal device, the first target information includes uplink control information, uplink information, or second sidelink information, and the second sidelink information is sidelink information corresponding to sidelink transmission between the first terminal device and the control node; and
  the first resource and the second resource meet a resource configuration rule, and the resource configuration rule includes at least a rule that the first resource and the second resource do not overlap.

According to a fifth aspect, the embodiments of the present disclosure further provide a terminal device, including a processor, a memory, and a computer program that is stored in the memory and executable on the processor, where when the computer program is executed by the processor, the steps of the information transmission method provided in the first aspect are implemented.

According to a sixth aspect, the embodiments of the present disclosure further provide a control node, including a processor, a memory, and a computer program that is stored in the memory and executable on the processor, where when the computer program is executed by the processor, the steps of the information transmission method provided in the second aspect are implemented.

According to a seventh aspect, the embodiments of the present disclosure further provide a non-transitory computer-readable storage medium, where the non-transitory computer-readable storage medium stores a computer program, and when the computer program is executed by a processor, the steps of the information transmission method provided in the first aspect or the steps of the information transmission method provided in the second aspect are implemented.

BRIEF DESCRIPTION OF DRAWINGS

To describe the technical solutions in the embodiments of the present disclosure more clearly, the following briefly describes the accompanying drawings required for describing the embodiments of the present disclosures. Apparently, the accompanying drawings in the following description show merely some embodiments of the present disclosure, and a person of ordinary skill in the art may still derive other drawings from these accompanying drawings.

FIG. 1F is a schematic diagram of UCI multiplexing according to an embodiment of the present disclosure;

FIG. 2 is a structural diagram of a network system to which the embodiments of the present disclosure can be applied;

FIG. 3 is a flowchart of an information transmission method according to an embodiment of the present disclosure;

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

In the specification and claims of this application, the terms "first", "second", and the like are intended to distinguish between similar objects but do not necessarily describe a specific order or sequence. It should be understood that the data termed in such a way is interchangeable in proper circumstances so that the embodiments of this application described herein can be implemented, for example, in an order other than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device. In addition, in the specification and claims, "and/or" is used to indicate at least one of connected objects, for example, A and/or B and/or C, and to indicate seven cases: only A, only B, only C, A and B, B and C, A and C, and A, B and C.

For ease of description, the following describes some content in the embodiments of the present disclosure.

Figure 1A:
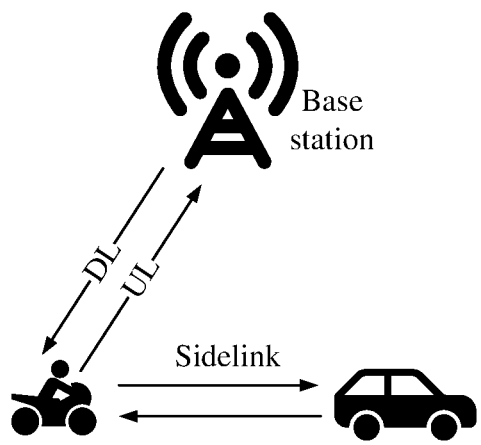
FIG. 1A is a schematic diagram of uplink-downlink communication and sidelink communication according to an embodiment of the present disclosure.

Hybrid Automatic Repeat Request (HARQ) Mechanism:

A control node and UE (which may also be referred to as a terminal device) communicate with each other through a Uu interface by using an uplink and a downlink. The UE and other UE communicate with each other through a PC5 interface by using a sidelink (which may also be referred to as a direct link, a secondary link, a side link, or an edge link), as shown in FIG. 1A.

Figure 1B:
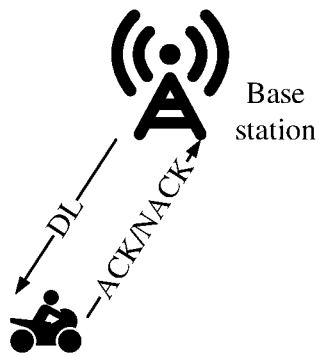
FIG. 1B is a schematic diagram of uplink-based HARQ-ACK feedback according to an embodiment of the present disclosure.

In new radio (NR), as shown in FIG. 1B, for transmission of a downlink data packet, the UE may feed back HARQ-ACK information (a NACK or an ACK) on a physical uplink control channel (PUCCH) or a physical uplink shared channel (PUSCH) based on a receiving state and a decoding state of the UE, to notify the control node whether the downlink data packet is successfully transmitted, thereby helping the control node determine whether retransmission is required. This mechanism can effectively improve reliability and resource utilization of downlink data transmission.

The UE sends sidelink control information (SCI) by using a physical sidelink control channel (PSCCH) on a sidelink, and schedules transmission of a physical sidelink shared channel (PSSCH) to send sidelink data. To improve reliability and resource utilization of data transmission on the sidelink, a HARQ feedback mechanism is also introduced in an NR sidelink technology. After receiving sidelink data, sidelink receiving UE may feed back sidelink HARQ-ACK information to indicate whether sidelink transmission succeeds or fails. The HARQ response is sent by using a physical sidelink feedback channel (PSFCH).

Figure 1C:
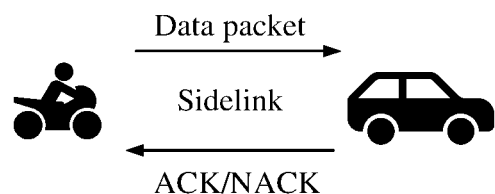
FIG. 1C is a schematic diagram of sidelink-based HARQ-ACK feedback according to an embodiment of the present disclosure.

However, different from the HARQ feedback mechanism of a downlink data packet on an NR Uu interface, sidelink transmission may not be performed between the control node and the UE, but may be performed on a sidelink between UEs. As shown in FIG. 1C, the control node cannot directly know whether transmission of the sidelink data packet succeeds, and the UE needs to send sidelink HARQ-ACK information to the control node, so that the control node can further determine whether transmission on the sidelink succeeds, and finally determine whether to schedule the UE to perform retransmission on the sidelink. UE that reports sidelink information may be sending UE, or may be receiving UE. The sending UE and the receiving UE may be UE that sends and receives sidelink transmission corresponding to the sidelink information. It should be noted that one sidelink UE may be sending or receiving UE. For example, the UE sends sidelink data at a moment a1, and receives sidelink data from other UE at a moment a2.

Figure 1D:
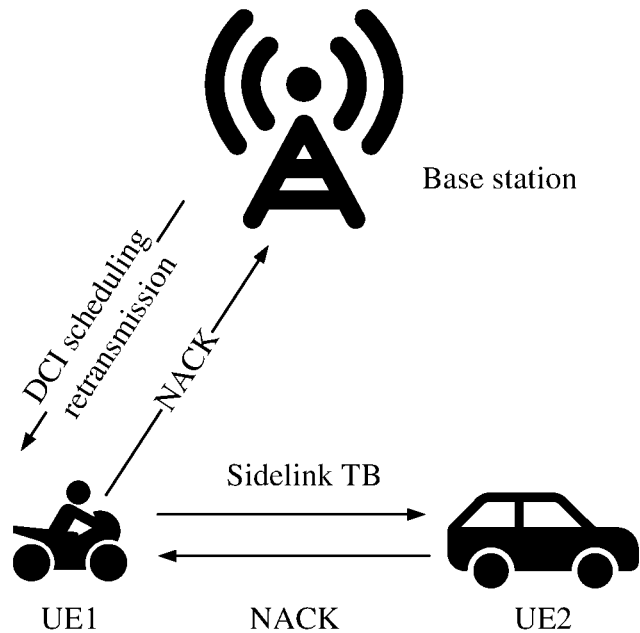
FIG. 1D is a schematic diagram in which sending UE reports a HARQ-ACK according to an embodiment of the present disclosure.

An example in which sending UE reports sidelink HARQ-ACK information to the control node may be shown in FIG. 1D. The control node schedules UE 1 to send a transport block (TB) to UE2 on a sidelink. The UE2 receives the TB but fails to parse the TB. Therefore, the UE2 feeds back a NACK on a PSFCH. The UE1 maps the sidelink NACK to a Uu NACK and sends the Uu NACK to the control node on a target resource. After receiving the NACK, the control node learns that transmission of the TB fails. Therefore, the control node sends scheduling signaling to schedule the UE1 to retransmit the TB on the sidelink.

Figure 1E:
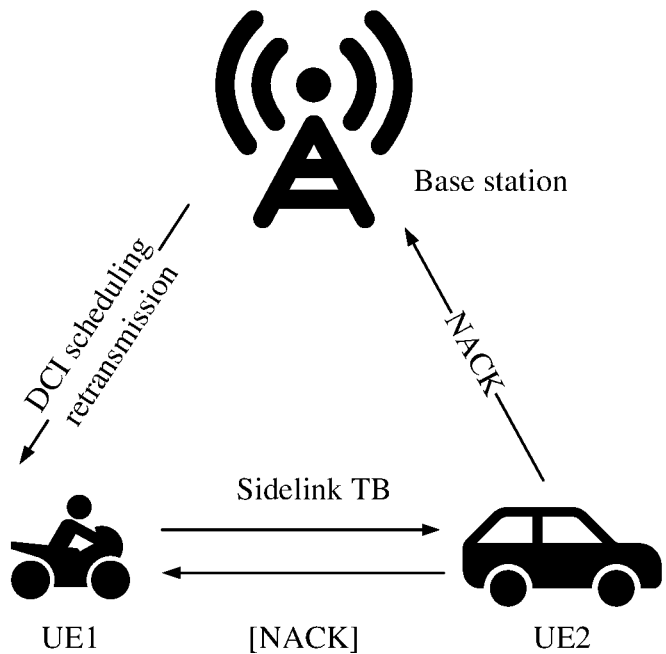
FIG. 1E is a schematic diagram in which receiving UE reports a HARQ-ACK according to an embodiment of the present disclosure.

An example in which receiving UE reports sidelink HARQ-ACK information to the control node may be shown in FIG. 1E. After sidelink receiving UE determines sidelink HARQ-ACK information through sidelink transmission and decoding, if there is a Uu connection between the sidelink receiving UE and the control node and a corresponding target resource is allocated, the sidelink receiving UE may directly send the sidelink HARQ-ACK information to the control node on the target resource. In this case, the sidelink HARQ-ACK information does not need to be sent to sending UE by using a PSFCH. In FIG. 1E, a square bracket is added for the operation in which the UE2 transmits the NACK to the UE1 indicates that this step may or may not exist.

Resource Allocation Mode and Control Node in a Sidelink:

There are two resource allocation modes in the sidelink: a scheduled resource allocation mode and an autonomous resource selection mode. In the former mode, the control node controls and allocates a resource to each UE, and in the latter mode, the UE independently selects a resource. For some UEs, the two resource allocation modes may also be performed at the same time.

In the sidelink, the control node may be a base station, an integrated access backhaul (IAB), user equipment, a relay device, a road side unit (RSU), or the like, or may be some other network facilities similar to the RSU or the IAB. In addition, some control nodes can support both a sidelink and a Uu link.

Uplink Control Information (UCI):

In release 15 new radio (R15 NR), uplink control information fed back by UE is collectively referred to as UCI, and an important component of the UCI is HARQ-ACK information. In addition to this, the UCI may further include a channel state information (CSI) report, a scheduling request (SR), and the like.

The UCI may perform transmission on a PUCCH resource or a PUSCH resource. The PUCCH resource may support five formats, and features of different formats are different. A PUCCH Format 0 carries 1-bit UCI or 2-bit UCI in a form of a sequence, occupies one or two symbols in time domain, and occupies one resource block (RB) in frequency domain.

Sidelink Information:

HARQ-ACK information transmitted on a sidelink may be transmitted on a PSFCH channel In addition, CSI transmitted on the sidelink may be transmitted on a PSSCH. The PSFCH currently supports a sequence based on a PUCCH Format 0 (however, a quantity of time-frequency domain resources that may be occupied is different, another new feature may be introduced, or another new format is introduced). Therefore, the PUCCH Format 0 may be referred to as a PSFCH Format 0. It should be noted that the PUCCH Format 0 is not limited to the PSFCH Format 0, and may have another name based on an actual situation.

It should be noted that, to make a distinction, HARQ-ACK information of uplink information transmitted on an uplink may be referred to as Uu HARQ-ACK information, and HARQ-ACK information transmitted on a sidelink may be referred to as sidelink HARQ-ACK information.

UCI Multiplexing in NR:

In NR, if code block group (CBG) transmission is not configured, HARQ-ACK information corresponding to one TB is 1 bit. If the bit is 1, it indicates an ACK, and if the bit is 0, it indicates a NACK. If the control node sends a plurality of TBs, and the control node instructs UE to send HARQ-ACK information corresponding to these TBs to the control node on a same resource, the UE may multiplex the HARQ-ACK information of these TBs into a new piece of HARQ-ACK information (for example, a bitmap) in a manner specified in a protocol (for example, a codebook), and report the HARQ-ACK information to the control node.

For example, as shown in FIG. 1F, the control node sends three TBs, where a TB#1 and a TB#3 are successfully decoded by the UE, and decoding of a TB#2 fails. Therefore, values of bits of HARQ-ACK information corresponding to the three TBs are 1, 1, and 0, respectively indicating an ACK, an ACK, and a NACK. In addition, if the control node instructs the UE to send, on a same PUCCH, the bits of the HARQ-ACK information corresponding to the three TBs, the UE multiplexes the bits of the three piece of HARQ-ACK information into one bitmap 101 and sends the bitmap 101 to the control node.

The embodiments of the present disclosure provide an information transmission method. Referring to FIG. 2, FIG. 2 is a structural diagram of a network system to which the embodiments of the present disclosure can be applied. As shown in FIG. 2, the network system includes a first terminal device 11, a second terminal device 12, and a control node 13. Each of the first terminal device 11 and the second terminal device 12 may be a user side device such as a mobile phone, a tablet personal computer, a laptop computer, a personal digital assistant (PDA), a mobile internet device (MID), a wearable device, or a vehicle-mounted terminal. It should be noted that a specific type of the first terminal device 11 and the second terminal device 12 is not limited in the embodiments of the present disclosure. The control node 13 may be a base station, for example, a macro base station, an LTE eNB, a 5G NR NB, or a gNB. The control node 13 may also be a small cell, such as a low power node (LPN) pico or a femto, or the control node 13 may be an access point (AP), or the control node 13 may be an IAB, user equipment, a relay device, or an RSU. The base station may also be a network node formed by a central unit (CU) and a plurality of TRPs that are managed and controlled by the CU. It should be noted that a specific type of the control node 13 is not limited in the embodiments of the present disclosure.

It should be noted that the control node 13 may support sidelink transmission through sidelink scheduling or sidelink transmission through Uu link scheduling, or may also support sidelink transmission through sidelink scheduling and Uu link scheduling.

It should be noted that transmission in the embodiments of the present disclosure may include sending or receiving.

An embodiment of the present disclosure provides an information transmission method, applied to a first terminal device. Referring to FIG. 3, FIG. 3 is a flowchart of an information transmission method according to an embodiment of the present disclosure. As shown in FIG. 3, the method includes the following steps.

Step 301: Transmit first sidelink information and first target information on a target resource, or prohibit transmission of the first sidelink information and the first target information on a same transmission resource.

The first sidelink information is sidelink information corresponding to sidelink transmission between the first terminal device and a second terminal device, the first target information includes uplink information or second sidelink information, and the second sidelink information is sidelink information corresponding to sidelink transmission between the first terminal device and a control node.

In this embodiment, the target resource may be any resource that can be used to transmit the first sidelink information and the first target information through multiplexing. For example, the target resource may be a resource specifically configured to transmit the first sidelink information and the first target information through multiplexing, or the target resource may be a resource used to transmit the first sidelink information or a resource used to transmit the first target information. It should be noted that the target resource may include one or at least two transmission resources.

Both the first sidelink information and the second sidelink information may include at least one of HARQ-ACK information, CSI, an SR, or the like that are corresponding to sidelink transmission. The uplink information may include at least one of HARQ-ACK information (for example, an ACK/NACK for a downlink PDSCH), CSI (for example, a measurement report for a downlink CSI-RS CSI Report), or an SR (for example, an SR for requesting uplink scheduling) transmitted on a Uu link. The uplink transmission may be uplink transmission based on a Uu interface. The HARQ-ACK information may include an ACK or a NACK.

It should be noted that, for ease of description, in this embodiment, HARQ-ACK information corresponding to sidelink transmission may be referred to as sidelink HARQ-ACK information, and HARQ-ACK information corresponding to uplink transmission is referred to as Uu HARQ-ACK information. CSI corresponding to sidelink transmission may be referred to as sidelink CSI, and CSI corresponding to uplink transmission may be referred to as Uu CSI. An SR corresponding to sidelink transmission may be referred to as a sidelink SR, and an SR corresponding to uplink transmission may be referred to as a Uu SR.

Optionally, in a case that the first sidelink information includes the sidelink HARQ-ACK information, the sidelink HARQ-ACK information may be reported in one of the following manners:

Manner 1: Sending UE sends sidelink transmission, and receiving UE receives the sidelink transmission and determines sidelink HARQ-ACK information corresponding to the sidelink transmission, and may feed back the sidelink HARQ-ACK information to the sending UE by using a PSFCH or a PSSCH. For example, the sending UE may receive sidelink HARQ-ACK information corresponding to at least one sidelink transmission or receive sidelink HARQ-ACK information from at least one receiving UE. In this case, the sending UE may report the sidelink HARQ-ACK information to the control node.

Manner 2: Sending UE sends sidelink transmission, and receiving UE receives at least one sidelink transmission, and determines sidelink HARQ-ACK information corresponding to each Sidelink transmission. In this case, the receiving UE may report the sidelink HARQ-ACK information to the control node.

It should be noted that the first terminal device may be sending UE or may be receiving UE.

In an implementation, in a case that the first sidelink information and the first target information need to be transmitted simultaneously, the first sidelink information and the first target information may be transmitted on a same transmission resource through multiplexing, for example, the target resource, so that integrity of information transmission can be improved.

Optionally, in this embodiment, in a case that a transmission resource used for the first sidelink information conflicts with a transmission resource used for the first target information, the first sidelink information and the first target information may be transmitted on the target resource through multiplexing In another implementation, transmission of the first sidelink information and the first target information through multiplexing on a same transmission resource may be prohibited, so that simplicity of information transmission can be improved. For example, the first terminal device may deem or expect that the control node configures different transmission resources for the first sidelink information and the first target information, to ensure that the first sidelink information and the first target information are transmitted on different transmission resources without multiplexing transmission, or the first terminal device may discard at least one of the first sidelink information or the first target information in a case that the transmission resource used for the first sidelink information conflicts with the transmission resource used for the first target information.

In this embodiment of the present disclosure, the first sidelink information and the first target information are transmitted through multiplexing, or the first sidelink information and the first target information are not transmitted through multiplexing, to provide a manner of transmitting first sidelink information and feedback information to a control node in a case that user equipment needs to simultaneously feed back, to the control node, the first sidelink information corresponding to sidelink transmission between the user equipment and another user equipment and the feedback information corresponding to transmission between the user equipment and the control node, thereby facilitating information transmission control.

Optionally, the prohibiting transmission of the first sidelink information and the first target information on a same transmission resource includes at least one of:

transmitting the first sidelink information on a first resource and transmitting the first target information on a second resource in a case that the first resource and the second resource meet a resource configuration rule; or discarding at least one of the first sidelink information or the first target information in a case that a first resource and a second resource do not meet a resource configuration rule, where the first resource is a transmission resource used for the first sidelink information, the second resource is a transmission resource used for the first target information, and the resource configuration rule includes at least a rule that the first resource and the second resource do not overlap.

In an implementation, the first terminal device may deem or expect that the first resource and the second resource meet the resource configuration rule. For example, the first resource and the second resource do not overlap. It can be understood that, that the first resource and the second resource do not overlap means that the first resource and the second resource are different. In this way, the first terminal device may separately transmit the first sidelink information on the first resource, and transmit the first target information on the second resource.

In another implementation, the first resource and the second resource may not meet the resource configuration rule. For example, the first resource and the second resource may overlap. In this case, the first terminal device may deem or expect that the first sidelink information and the first target information are not transmitted on a same transmission resource. For example, the first terminal device may deem that a configuration error occurs on the control node side, and no information is transmitted, that is, the first sidelink information and the first target information are discarded; or the first terminal device may transmit only one of at least a part of the first sidelink information and at least a part of the first target information, that is, discard one of the first sidelink information and the first target information.

It should be noted that the transmission resource used for the first sidelink information and the transmission resource used for the first target information may be configured or indicated by the control node, may be predefined by a protocol, may be preconfigured, may be negotiated between terminals, or may be indicated by another terminal device. The another terminal device may be a terminal device other than the first terminal device. This is not limited in this embodiment.

Optionally, the resource configuration rule may further include at least one of:
- a time interval between the first resource and the second resource is greater than a first preset time interval;
- a frequency domain gap between the first resource and the second resource is greater than a first preset frequency domain gap;
- the first resource and the second resource are in different time units; or
- the first resource and the second resource are in different frequency domain units.

In this embodiment, both the first preset time interval and the first preset frequency domain gap may be predefined by a protocol, pre-configured, configured by the control node, negotiated by terminals, or indicated by another terminal device, and the another terminal device may be a terminal device other than the first terminal device.

The time unit may be properly set based on an actual requirement, for example, may be a slot, a subslot, a time window, or a timer. For example, the second resource does not exist in a slot in which the first resource is located, or the second resource does not exist in a time window in which a time domain location of the first resource starts, or the second resource does not exist before a timer enabled by using the first resource as a reference point expires. The frequency domain unit may also be properly set based on an actual requirement, for example, may be 10 MHZ or 100 RB, a same bandwidth part (BWP), a same carrier, a same resource pool, or a same sub-channel, to avoid mutual interference or an in-band emission (IBE) effect because a user needs to send two resources to a control node in a same frequency domain range.

In actual application, for the first resource and the second resource, the first terminal device may deem or expect at least one of:
- the first terminal device may deem or expect that a time interval between the first resource and the second resource is greater than a first preset time interval;
- the first terminal device may deem or expect that a frequency domain gap between the first resource and the second resource is greater than a first preset frequency domain gap;
- the first terminal device may deem or expect that the first resource and the second resource are in different time units; or
- the first terminal device may deem or expect that the first resource and the second resource are in different frequency domain units.

In this embodiment of the present disclosure, the first terminal device may deem or expect that the first resource and the second resource meet the resource configuration rule. In this way, the first sidelink information and the first target information can be transmitted separately, thereby improving reliability of information transmission. In addition, in a case that the first resource and the second resource do not meet the resource configuration condition, at least one of the first sidelink information or the first target information may be discarded, thereby improving flexibility of information transmission control.

Optionally, the discarding at least one of the first sidelink information or the first target information may include:
- discarding the first sidelink information and the first target information; or
- discarding a part of the first sidelink information and the first target information based on a first target parameter, where the first target parameter includes at least one of: a first preset priority relationship, a transmission priority relationship, a transmission requirement, transmission quality of service (QoS), or a transmission data volume.

In an implementation, in a case that the first resource and the second resource do not meet the resource configuration condition, it may be deemed that configuration on the control node side is incorrect, and the first sidelink information and the first target information are discarded.

In another implementation, in a case that the first resource and the second resource do not meet the resource configuration condition, a part of the first sidelink information and the first target information may be discarded. For example, the first sidelink information may be discarded, or a part of the first sidelink information and the first target information may be discarded, or the first target information may be discarded, or a part of the first target information and the first sidelink information may be discarded.

For example, in this implementation, a part of the first sidelink information and the first target information may be discarded based on at least one of the first preset priority relationship, the transmission priority, the transmission requirement, the transmission QoS, or the transmission data volume.

The transmission requirement may include at least one of a communication range, reliability, a data rate, a latency (Max end-to-end Latency), a payload, or the like.

The transmission QoS may include at least one of a PC5 5G quality of service indicator (PQI), a PC5 flow bit rate, a PC5 link aggregated bit rate, or the like.

Optionally, the first preset priority relationship may include at least one of:
- a priority of the first sidelink information being lower than a priority of the first target information;
- a priority of CSI of the first sidelink information being lower than a priority of HARQ-ACK information of the first sidelink information;
- the priority of the CSI of the first sidelink information being lower than a priority of an SR in the first sidelink information;
- the priority of the CSI of the first sidelink information being lower than the priority of the HARQ-ACK information of the first sidelink information;
- a priority of CSI of the first target information being lower than a priority of HARQ-ACK information in the first target information;
- the priority of the CSI of the first target information being lower than a priority of an SR in the first target information; or
- the priority of the SR in the first target information being lower than the priority of the HARQ-ACK information in the first target information.

Optionally, in a case that the first target information is the second sidelink information, the first preset priority relationship may not include any one of the priority of the CSI of the first target information being lower than the priority of the SR in the first target information and the priority of the SR in the first target information being lower than the priority of the HARQ-ACK information in the first target information.

The following describes the discarding a part of the first sidelink information and the first target information based on a first target parameter by using an example:

Manner 1: Discard information in the first sidelink information and the first target information in ascending order in the first preset priority relationship.

For example, if the priority of the first sidelink information is lower than the priority of the first target information, the first sidelink information is preferably discarded. If the priority of the first sidelink information is higher than the priority of the first target information, the first target information is preferably discarded.

Optionally, after the first sidelink information or the first target information is discarded, different types of information may be discarded based on priorities of the different types of information. For example, after the first target information is discarded, if the priority of the CSI of the first sidelink information is lower than the priority of the HARQ-ACK information, the CSI of the first sidelink information may be discarded first.

Manner 2: Information corresponding to transmission with a low transmission priority may be preferentially discarded from the first sidelink information and the first target information.

Manner 3: Information corresponding to transmission with a low transmission QoS requirement may be preferentially discarded from the first sidelink information and the first target information; or information corresponding to transmission whose transmission QoS identifier is relatively small is preferentially discarded.

Manner 4: A part of the first sidelink information and the first target information may be discarded based on a data volume of the first sidelink information, a data volume of the first target information, and an amount of data that can be transmitted on a transmission resource of information to be transmitted after the part of information is discarded, so that a data volume of information to be transmitted after the part of information is discarded is less than or equal to the foregoing amount of data that can be transmitted.

Manner 5: A part of the first sidelink information and the first target information may be discarded based on a transmission priority and a transmission data volume.

For example, one of the first sidelink information and the first target information may be first discarded based on the transmission priority, and a part of the other piece of information may be discarded based on an amount of data that can be transmitted on a transmission resource of information to be transmitted after the part of information is discarded.

Manner 6: A part of the first sidelink information and the first target information may be discarded based on a transmission requirement.

For example, information corresponding to transmission with a low transmission requirement may be preferentially discarded from the first sidelink information and the first target information.

It should be noted that, after discarding a part of the first sidelink information and the first target information based on the first target parameter, the first terminal device may report information that is not discarded in the first sidelink information and the first target information to the control node.

In this embodiment of the present disclosure, a part of the first sidelink information and the first target information is discarded based on at least one of the first preset priority relationship, the transmission priority, the transmission requirement, the transmission QoS, or the transmission data volume, thereby improving rationality of information discarding and further improving service performance.

Optionally, the transmitting first sidelink information and first target information on a target resource includes:
  in a case that the first sidelink information and the first target information meet a preset multiplexing condition, transmitting the first sidelink information and the first target information on the target resource.

In this embodiment, in a case that the first sidelink information and the first target information meet the preset multiplexing condition, the first sidelink information and the first target information are transmitted through multiplexing, thereby improving integrity of information transmission and further improving service performance.

Optionally, the preset multiplexing condition may include at least one of:
  a third resource and a fourth resource overlap;
  a time interval between the third resource and the fourth resource is less than or equal to a second preset time interval;
  a frequency domain gap between the third resource and the fourth resource is less than or equal to a second preset frequency domain gap;
  the third resource and the fourth resource are in a same time unit;
  the third resource and the fourth resource are in a same time unit, and a total quantity of transmission resources of the third resource and the fourth resource in the time unit is greater than a first threshold;
  the third resource and the fourth resource are in a same frequency domain unit;
  the third resource and the fourth resource are in a same frequency domain unit, and a total quantity of transmission resources of the third resource and the fourth resource in the frequency domain unit is greater than a second threshold;
  the third resource and the fourth resource are in a same time unit, and both the first sidelink information and the first target information include HARQ-ACK information;
  the third resource and the fourth resource are in a same time unit, and both the third resource and the fourth resource include a long format physical uplink control channel resource; or
  information types of at least a part of the first sidelink information and the first target information are different, where
  the third resource is a transmission resource used for the first sidelink information, and the fourth resource is a transmission resource used for the first target information.

In this embodiment, both the second preset time interval, the second preset frequency domain gap, the first threshold, and the second threshold may be predefined by a protocol, pre-configured, configured by the control node, negotiated by terminals, or indicated by another terminal device, and the another terminal device may be a terminal device other than the first terminal device. The second preset time interval, the second preset frequency domain gap, the first threshold, and the second threshold may be properly set based on an actual situation. For example, the first threshold may be 2, and the second threshold may be 2.

The time unit may be properly set based on an actual requirement, for example, may be a slot, a subslot, a time window, or a timer. For example, the third resource and the fourth resource exist in a same slot or a same time window, or the third resource and the fourth resource exist before an enabled timer expires. The frequency domain unit may also be properly set based on an actual requirement, for example, may be 10 MHZ or 100 RB, a same bandwidth part (BWP), a same carrier, a same resource pool, or a same sub-channel. The long format physical uplink control channel resource is also a long format PUCCH resource.

That a third resource and a fourth resource overlap may include: the third resource and the fourth resource partially or completely overlap.

Information types of at least a part of the first sidelink information and the first target information are different. For example, the first sidelink information is CSI, and the first target information is HARQ-ACK information.

Optionally, the target resource may include one of the following:
 a transmission resource used to transmit the first sidelink information and the first target information through multiplexing;
 a transmission resource indicated by the latest received scheduling signaling;
 a transmission resource closest to a target moment, where the target moment is a moment at which the first sidelink information and the first target information are transmitted through multiplexing;
 a transmission resource used for the first sidelink information;
 a transmission resource determined based on at least one of the first sidelink information or the first target information; and
 a transmission resource determined based on at least one of a resource type of a transmission resource used for the first sidelink information or a resource type of a transmission resource used for the first target information.

In this embodiment, the transmission resource used to transmit the first sidelink information and the first target information through multiplexing may be predefined by a protocol, pre-configured, negotiated by terminals, configured by the control node, or indicated by another terminal device, and the another terminal device may be a terminal device other than the first terminal device. The transmission resource used to transmit the first sidelink information and the first target information through multiplexing may be a transmission resource dedicated to transmit the first sidelink information and the first target information through multiplexing.

The scheduling signaling may include DCI or sidelink control information (SCI).

The determining the target resource based on at least one of the first sidelink information or the first target information may be, for example, determining the target resource based on at least one of a data volume of the first sidelink information and a data volume of the first target information, or determining the target resource based on at least one of an information type of the first sidelink information or an information type of the first target information. The information type may include but is not limited to a type such as HARQ-ACK information, CSI, or an SR.

The resource types may be classified based on one or more dimensions. For example, different resource types may be classified based on one or more of a resource format, a bearer size, a time domain length, and a quantity of resources occupied in frequency domain. For example, for PUCCHs in formats such as a PUCCH Format 0, a PUCCH Format 1, a PUCCH Format 2, a PUCCH Format 3, and a PUCCH Format 4 may respectively represent different types of resources.

Optionally, the target resource may be a transmission resource determined based on an information type of at least one of the first sidelink information or the first target information.

For example, if the first sidelink information is HARQ-ACK information and the uplink information is CSI, or the first sidelink information is CSI and the uplink information is HARQ-ACK information, it may be determined that a transmission resource corresponding to the CSI is the target resource.

As another example, if the first sidelink information is HARQ-ACK information and the uplink information is an SR, or the first sidelink information is an SR and the uplink information is HARQ-ACK information, it may be determined that a transmission resource corresponding to the HARQ-ACK information is the target resource.

For example, if the first sidelink information is HARQ-ACK information and the uplink information is an SR, or the first sidelink information is an SR and the uplink information is HARQ-ACK information, and the SR is positive (being used to indicate that scheduling needs to be required), it may be determined that a transmission resource corresponding to the SR is the target resource.

As another example, if the first sidelink information is CSI and the uplink information is an SR, or the first sidelink information is an SR and the uplink information is CSI, a transmission resource corresponding to the CSI may be determined as the target resource.

Optionally, the target resource may include a transmission resource selected based on a data volume of the first sidelink information and the first target information.

Optionally, an amount of data that can be transmitted on the target resource may be greater than or equal to a first data volume; and
 the first data volume may be a total data volume before the first sidelink information and the first target information are multiplexed, or a total data volume after the first sidelink information and the first target information are multiplexed.

In this embodiment, a transmission resource for which an amount of data that can be transmitted is greater than or equal to a first data volume may be selected from optional transmission resources, to transmit the first sidelink information and the first target information through multiplexing, thereby ensuring complete transmission of the first sidelink information and the first target information.

Optionally, in a case that there is a plurality of transmission resources for which an amount of data that can be transmitted is greater than or equal to the first data volume in the optional transmission resources, one transmission resource may be randomly selected from the plurality of transmission resources, or a transmission resource corresponding to a smallest difference from the first data volume may be selected from the plurality of transmission resources. That is, the target resource may be a transmission resource corresponding to a smallest difference between an amount of data that can be transmitted and the first data volume in transmission resources for which an amount of data that can be transmitted is greater than or equal to a target data volume, thereby reducing a resource waste.

It should be noted that the optional transmission resource may be at least one transmission resource or at least one transmission resource set that is predefined by a protocol, configured by the control node, preconfigured, negotiated between terminals, or configured by another terminal device. For example, the optional transmission resource may be the foregoing obtained used to transmit the first sidelink information and the first target information through multiplexing, or the transmission resource indicated by the latest received scheduling signaling, or the transmission resource closest to the target moment, where the target moment is a moment at which the first sidelink information and the first target information are transmitted through multiplexing, or the obtained transmission resource used for the first sidelink information, or the transmission resource determined based on at least one of the first sidelink information or the first target information, or the transmission resource determined based on at least one of the resource type of the transmission resource used for the first sidelink information or the resource type of the transmission resource used for the first target information.

Optionally, the method may further include:
discarding a part of first information in a case that an amount of data that can be transmitted on the target resource is less than a second data volume, where
a data volume of the first information obtained after the part of information is discarded is less than the amount of data that can be transmitted on the target resource, and is closest to the amount of data that can be transmitted on the target resource, or a data volume of the first information obtained after the part of information is discarded is equal to the amount of data that can be transmitted on the target resource; the first information includes the first sidelink information before the multiplexing and the first sidelink information, or the first sidelink information after the multiplexing and the first sidelink information; and the second data volume is a data volume of the first information.

In this embodiment, in a case that the amount of data that can be transmitted on the target resource is less than the second data volume, all of the first information cannot be transmitted on the target resource. Therefore, a part of the first information may be discarded, so that a data volume of the first information after the part of information is discarded is less than the amount of data that can be transmitted on the target resource and is closest to the amount of data that can be transmitted on the target resource, or is equal to the amount of data that can be transmitted on the target resource. The first information after the part of information is discarded may be transmitted on the target resource.

It should be noted that the discarding a part of first information may include discarding at least one of a part of the first sidelink information or a part of the first target information.

Optionally, the discarding a part of first information in a case that an amount of data that can be transmitted on the target resource is less than a second data volume may include:
discarding a part of the first information based on a second target parameter in a case that the amount of data that can be transmitted on the target resource is less than the second data volume, where the second target parameter includes at least one of: a second preset priority relationship, a transmission priority, a transmission requirement, transmission quality of service QoS, or a transmission data volume.

In this embodiment, the transmission requirement may include at least one of a communication range, reliability, a data rate, a latency, a payload, or the like.

The transmission QoS may include at least one of a PQI, a PC5 flow bit rate, a PC5 link aggregated bit rate, or the like.

The following describes the discarding a part of the first information based on a second target parameter by using an example.

Manner 1: A part of the first information is discarded in ascending order based on the second preset priority relationship.

For example, if the priority of the first sidelink information is lower than the priority of the first target information, at least a part of the first sidelink information is preferably discarded. If the priority of the first sidelink information is higher than the priority of the first target information, at least a part of the first target information is preferably discarded.

Optionally, in a case that it is determined to discard at least a part of the first sidelink information or at least a part of the first target information, different types of information may be discarded based on priorities of different types of information. For example, in a case that it is determined to discard at least a part of the first sidelink information, if the priority of the CSI of the first sidelink information is lower than the priority of the HARQ-ACK information, the CSI of the first sidelink information may be first discarded.

Manner 2: At least a part of information corresponding to transmission with a low transmission priority may be preferentially discarded from the first information.

Manner 3: At least a part of information corresponding to transmission with a low QoS requirement may be preferentially discarded from the first information; or information corresponding to transmission whose transmission QoS identifier is relatively small is preferentially discarded.

Manner 4: A part of the first information may be discarded based on a data volume of the first information and an amount of data that can be transmitted on the target resource, so that a data volume of the first information after the part of the information is discarded is less than or equal to the amount of data that can be transmitted on the target resource.

Manner 5: A part of the first information may be discarded based on a transmission QoS and a transmission data volume.

For example, information corresponding to transmission with a low QoS requirement may be preferentially discarded, and a part of remaining information is discarded based on an amount of data that can be transmitted on the target resource, so that a data volume of the first information after the information is discarded is less than or equal to the amount of data that can be transmitted on the target resource.

Manner 6: A part of the first information may be discarded based on a transmission requirement.

For example, information corresponding to transmission with a low transmission requirement may be preferentially discarded from the first information.

It should be noted that, after a part of the first information is discarded based on the second target parameter, the first terminal device may transmit, on the target resource, the first information after the part of information is discarded.

In this embodiment of the present disclosure, a part of the first sidelink information and the first target information is discarded based on at least one of the second preset priority relationship, the transmission priority, the transmission QoS, or the transmission data volume, thereby improving rationality of information discarding and further improving service performance.

Optionally, in a case that the first target information includes the uplink information, the second preset priority relationship may include at least one of:
- a priority of a CSI second part of the uplink information is lower than a priority of a CSI report of the first sidelink information;
- the priority of the CSI report of the first sidelink information is lower than a priority of a CSI first part of the uplink information; or
- the priority of the CSI first part of the uplink information is lower than a priority of second information, where the second information includes at least one of HARQ-ACK information of the uplink information, HARQ-ACK information of the first sidelink information, an SR of the uplink information, or an SR in the first sidelink information.

The CSI second part is a CSI part 2. The CSI report is a CSI report. The CSI first part is a CSI part 1.

In this embodiment, in a case that the first target information includes the uplink information, a priority of a CSI part 2 (Uu CSI Part 2) for a Uu interface may be set to be lower than a priority of a CSI report (sidelink CSI Report) transmitted for a sidelink; the priority of the sidelink CSI Report may be set to be lower than a priority of a CSI part 1 (Uu CSI Part 1) for the Uu interface; and the priority of the Uu CSI Part 1 may be set to be lower than a priority of HARQ-ACK information and/or the priority of the Uu CSI part 1 is lower than a priority of an SR. The HARQ-ACK information may include at least one of HARQ-ACK information for sidelink transmission (sidelink HARQ-ACK information) or HARQ-ACK information for the Uu interface (Uu HARQ-ACK information), and the SR may include at least one of an SR for sidelink transmission (sidelink SR) or an SR for the Uu interface (Uu SR).

Optionally, in a case that the first target information includes the uplink information, the second preset priority relationship includes at least one of:
- a priority of a CSI report of the first sidelink information is lower than a priority of a CSI report of the uplink information;
- the priority of the CSI report of the uplink information is lower than a priority of HARQ-ACK information of the first sidelink information;
- the priority of the HARQ-ACK information of the first sidelink information is lower than a priority of HARQ-ACK information of the uplink information; or
- a priority of an SR in the first sidelink information is lower than a priority of an SR of the uplink information.

In this embodiment, in a case that the first target information includes the uplink information, a priority of a sidelink CSI report may be set to be lower than a priority of a Uu CSI report; the priority of the Uu CSI report may be set to be lower than a priority of sidelink HARQ-ACK information; the priority of the sidelink HARQ-ACK information may be set to be lower than a priority of Uu HARQ-ACK information, and a priority of a sidelink SR is lower than a priority of a Uu SR.

Optionally, in a case that the first target information includes the uplink information, the second preset priority relationship may include one of the following:
- a priority of a CSI report of the uplink information being lower than a priority of an aperiodic CSI report of the first sidelink information; and
- a priority of the first sidelink information being lower than a priority of the uplink information.

In this embodiment, in a case that the first target information includes the uplink information, a priority of a periodic Uu CSI report may be set to be lower than that of an aperiodic sidelink CSI report; or the priority of the first sidelink information may be set to be lower than the priority of the uplink information, that is, the first sidelink information is always preferentially discarded.

Optionally, in a case that the first target information includes the second sidelink information, the second preset priority relationship includes one of the following:
- a priority of CSI being lower than a priority of HARQ-ACK information; and
- a priority of the first sidelink information being lower than a priority of the second sidelink information.

In this embodiment, in a case that the first target information includes the second sidelink information, a priority of CSI may be set to be lower than a priority of HARQ-ACK information, or the priority of the first sidelink information is lower than the priority of the second sidelink information, that is, the first sidelink information is preferentially discarded.

It should be noted that the second preset priority relationship may be predefined by a protocol, pre-configured, configured by the control node, negotiated by terminals, or indicated by another terminal device.

Optionally, the transmitting first sidelink information and first target information on a target resource may include:
- transmitting first multiplexing information on the target resource, where
- the first multiplexing information includes one of the following:
  - information obtained by performing a cascade operation or an AND operation on second target information and the third target information;
  - information obtained by separately cascading information of a first type in the second target information and the third target information and performing an AND operation on information of a second type in the second target information and the third target information; and
  - information obtained by cyclically shifting one of the second target information and the third target information based on a target cyclic shift amount, where the target cyclic shift amount is determined based on the other of the second target information and the third target information or based on the second target information and the third target information; and
- the second target information includes at least a part of the first sidelink information, and the third target information includes at least a part of the first target information.

In actual application, in a process of multiplexing the first sidelink information and the first target information, a part of at least one of the first sidelink information or the first target information may also be discarded. Therefore, the first multiplexing information may be determined based on at least a part of information (the second target information) in the first sidelink information and at least a part of information (the third target information) in the first target information.

In an implementation, the second target information and the third target information may be cascaded to obtain the first multiplexing information.

Optionally, in this implementation, the second target information and the third target information may be directly cascaded without considering information types of the second target information and the third target information; or the second target information and the third target information may be cascaded based on information types of the second target information and the third target information.

Optionally, that the information types of the second target information and the third target information are different may include at least one of the following cases:
the second target information includes HARQ-ACK information, and the third target information includes CSI;
the second target information includes CSI, and the third target information includes HARQ-ACK information;
the second target information includes HARQ-ACK information, and the third target information includes an SR;
the second target information includes an SR, and the third target information includes HARQ-ACK information;
the second target information includes CSI, and the third target information includes an SR; or
the second target information includes an SR, and the third target information includes CSI.

Optionally, that the information types of the second target information and the third target information are the same may include at least one of the following cases:
the second target information includes HARQ-ACK information, and the third target information includes HARQ-ACK information;
the second target information includes an SR, and the third target information includes an SR; or
the second target information includes CSI, and the third target information includes CSI.

In another implementation, the AND operation may be performed on the second target information and the third target information to obtain the first multiplexing information.

The AND operation may include AND or bitwise AND. For example, a result obtained by performing an AND operation on 1100 and 0111 is 0, and a result obtained by performing a bitwise AND operation on 1100 and 0111 is 0100.

In this implementation, the AND operation may be directly performed on the second target information and the third target information without considering information types of the second target information and the third target information; or the AND operation may be performed on the second target information and the third target information based on information types of the second target information and the third target information.

Optionally, the first multiplexing information may include information obtained by performing an AND operation on information of a same type in the second target information and the third target information. That is, the first multiplexing information is obtained by performing the AND operation on the information of the same type in the second target information and the third target information.

Optionally, if information types of the second target information and the third target information are the same, and transmission corresponding to the second target information and transmission corresponding to the third target information meet a preset condition, the AND operation is performed on the second target information and the third target information to obtain the first multiplexing information. The preset condition may be, for example, that the transmission corresponding to the second target information and the transmission corresponding to the third target information are located in a same time unit, or that there is a resource overlap between the transmission corresponding to the second target information and the transmission corresponding to the third target information.

In another implementation, the information of the first type in the second target information and the third target information may be separately cascaded and the AND operation may be performed on the information of the second type in the second target information and the third target information to obtain the first multiplexing information. The first type and the second type may be any two different information types.

For example, if the first type may be a HARQ-ACK information type, and the second type may be an SR type, HARQ-ACK information in the second target information and HARQ-ACK information in the third target information may be cascaded, and the AND operation may be performed on an SR in the second target information and an SR in the third target information. If the first type may be a CSI type, and the second type may be a HARQ-ACK information type, CSI in the second target information and CSI in the third target information may be cascaded, and the AND operation may be performed on HARQ-ACK information in the second target information and HARQ-ACK information in the third target information.

In another implementation, one of the second target information and the third target information may be cyclically shifted based on the target cyclic shift amount to obtain the first multiplexing information. For example, the second target information may be cyclically shifted based on the target cyclic shift amount to obtain the first multiplexing information, where the target cyclic shift amount is determined based on the third target information, or is determined based on the third target information and the second target information; or the third target information may be cyclically shifted based on the target cyclic shift amount to obtain the first multiplexing information, where the target cyclic shift amount is determined based on the second target information, or is determined based on the second target information and the third target information.

Optionally, in a case that the second target information includes sidelink HARQ-ACK information and the third target information includes Uu HARQ-ACK information, bits reserved in a Uu HARQ codebook or not used or not corresponding to actual transmission (for example, a TB or a CBG or scheduling signaling that is not corresponding to actual transmission) may be used to carry the sidelink HARQ-ACK information, to obtain the first multiplexing information.

Optionally, in a case that the second target information includes sidelink HARQ-ACK information and the third target information includes sidelink HARQ-ACK information, bits reserved in a sidelink HARQ-ACK codebook or not used or not corresponding to actual transmission (for example, a TB or a CBG or scheduling signaling that is not corresponding to actual transmission) may be used to carry the sidelink HARQ-ACK information, to obtain the first multiplexing information.

Optionally, the first multiplexing information may include one of the following:
information obtained by cascading the second target information and the third target information as a whole; and
information obtained by cascading information of a same type in the second target information and the third target information, and cascading each obtained cascading result.

In an implementation, the second target information and the third target information may be cascaded as a whole to obtain the first multiplexing information. For example, if the second target information includes sidelink HARQ-ACK information and the third target information includes Uu CSI, the sidelink HARQ-ACK information and the Uu CSI may be cascaded. If the second target information includes sidelink HARQ-ACK information and sidelink CSI, and the third target information includes Uu CSI, the sidelink HARQ-ACK information and the sidelink CSI may be cascaded as a whole with the Uu CSI.

In another implementation, the information of the same type in the second target information and the third target information may be cascaded, and each obtained cascading result is cascaded to obtain the first multiplexing information. For example, if the second target information includes sidelink HARQ-ACK information and sidelink CSI, and the third target information includes Uu HARQ-ACK information and Uu CSI, the sidelink HARQ-ACK information and the Uu HARQ-ACK information may be separately cascaded to obtain a first cascading result, the sidelink CSI and the Uu CSI are cascaded to obtain a second cascading result, and the first cascading result and the second cascading result are cascaded to obtain the first multiplexing information.

Optionally, the first multiplexing information may include:
  information obtained by cascading the second target information and the third target information in a cascading sequence, where
  the cascading sequence is determined based on at least one of an information type of the second target information or an information type of the third target information, or is determined based on a resource type of the target resource.

In this embodiment, the information type may include but is not limited to a type such as HARQ-ACK information, CSI, or an SR.

The resource types may be classified based on one or more dimensions. For example, different resource types may be classified based on one or more of a resource format, a bearer size, a time domain length, and a quantity of resources occupied in frequency domain. For example, for PUCCHs in formats such as a PUCCH Format 0, a PUCCH Format 1, a PUCCH Format 2, a PUCCH Format 3, and a PUCCH Format 4 may respectively represent different types of resources.

The foregoing cascading sequence is used to indicate a location of the second target information and the third target information in a cascading process. For example, the cascading sequence is used to indicate that the second target information is placed behind the third target information, or the cascading sequence is used to indicate that the third target information is placed behind the second target information.

For example, if the second target information includes sidelink HARQ-ACK information, and the third target information includes Uu CSI, the cascading sequence may be that the sidelink HARQ-ACK information is located before the Uu CSI. If the second target information includes sidelink CSI, and the third target information includes Uu HARQ-ACK information, the cascading sequence may be that the Uu HARQ-ACK information is located before the sidelink CSI.

As another example, if the second target information includes sidelink HARQ-ACK information, and the third target information includes a Uu SR, the cascading sequence may be that the sidelink HARQ-ACK information is located before the Uu SR. If the second target information includes a sidelink SR, and the third target information includes Uu HARQ-ACK information, the cascading sequence may be that the Uu HARQ-ACK information is located before the sidelink SR.

As another example, if the second target information includes sidelink CSI, and the third target information includes a Uu SR, the cascading sequence may be that the sidelink CSI is located after the Uu SR. If the second target information includes a sidelink SR, and the third target information includes Uu CSI, the cascading sequence may be that the Uu CSI is located after the sidelink SR.

As another example, if the second target information includes sidelink CSI, and the third target information includes Uu CSI, the cascading sequence may be that the sidelink CSI is located before or after the Uu CSI.

As another example, if the second target information includes sidelink HARQ-ACK information, and the third target information includes Uu HARQ-ACK information, the cascading sequence may be that the Sidelink HARQ-ACK information is located before or after the Uu HARQ-ACK information.

As another example, if the second target information includes a sidelink SR, and the third target information includes a Uu SR, the cascading sequence may be that the sidelink SR is located before or after the Uu SR.

As another example, if the target resource is a PUCCH resource, the cascading sequence may be that information corresponding to the PUCCH resource in the second target information and the third target information is located after the other piece of information.

It should be noted that the cascading sequences in the foregoing examples may be properly combined based on an actual requirement. For example, if a cascading sequence a1 is that Uu HARQ-ACK information is located before a sidelink SR, and a cascading sequence a2 is that the sidelink SR is located before Uu CSI information, a combined cascading sequence may be obtained, that is, the Uu HARQ-ACK information is located before the sidelink SR, and the sidelink SR is located before the Uu CSI information.

Optionally, in a case that the first sidelink information is transmitted on a fifth resource, each type of information in the first sidelink information may be mapped to the fifth resource in a first mapping manner, where the first mapping manner is a mapping manner of any type of information in the uplink information; or
  in a case that the first sidelink information is transmitted on a fifth resource, third information in the first sidelink information may be mapped to the fifth resource in a second mapping manner, where the second mapping manner is a mapping manner of information of the same type as the third information in the uplink information, and the third information is any type of information in the first sidelink information.

In this embodiment, the fifth resource may be any transmission resource for transmitting the first sidelink information. For example, in a case that the first sidelink information and the first target information are not multiplexed, the fifth resource may be an obtained transmission resource used for the first sidelink information, and in a case that the first sidelink information and the first target information are multiplexed, the fifth resource may be the target resource.

In an implementation, all of the first sidelink information may be mapped to the second resource in a first mapping manner. The first mapping manner may be a mapping manner of any type of information in the uplink information, such as a mapping manner of Uu CSI part 2, a mapping manner of Uu CSI part 1, or a mapping manner of Uu HARQ-ACK information.

In actual application, when Uu UCI is mapped on a PUSCH, the Uu UCI may include at most three parts of information: a Uu HARQ-ACK, a Uu CSI part 1, and a Uu CSI part 2. The Uu HARQ-ACK is mapped from a first symbol after a first DMRS symbol of the PUSCH. The Uu CSI part 1 is mapped from a first non-DMRS position of the PUSCH. After the Uu CSI part 1 is mapped, the Uu CSI part 2 is mapped from an RE after the Uu CSI part 1. A mapping sequence is that the HARQ-ACK is first mapped, then the Uu CSI part 1 and the CSI part 2 are mapped, and finally a data part is mapped.

It should be noted that, in this embodiment, in a case that mapping is performed in a mapping manner of information in the uplink information, mapping may be performed on a PUSCH or a PSSCH.

In another implementation, each type of information in the first sidelink information may be separately mapped to the fifth resource in a mapping manner of information of the same type in the uplink information. For example, sidelink CSI is mapped in a mapping manner of Uu CSI, and the sidelink CSI is mapped in on a mapping manner of Uu CSI part 2; and sidelink HARQ-ACK information is mapped in a mapping manner of Uu HARQ-ACK information.

Optionally, in a case that the first sidelink information and the first target information are transmitted on the target resource, fourth information in second multiplexing information may be mapped to the target resource in a third mapping manner, where the second multiplexing information includes the first sidelink information and the first target information, the third mapping manner is a mapping manner of information of the same type as the fourth information in the uplink information, and the fourth information is any type of information in the first sidelink information.

In this embodiment, a mapping manner of the second multiplexing information may be independent of an information type. For example, in a case that the first sidelink information and the first target information are transmitted on the target resource through multiplexing, each type of information in the second multiplexing information may be mapped in a mapping manner of information of the same type in the uplink information. For example, if the first sidelink information is sidelink CSI and the first target information is Uu CSI, both CSI of the first sidelink information and CSI of the first target information may be used as CSI, and mapping is performed in a mapping manner of Uu CSI; or both HARQ-ACK information of the first sidelink information and HARQ-ACK information in the first target information may be used as HARQ-ACK information, and mapping is performed in a mapping manner of Uu HARQ-ACK information.

Optionally, in a case that the first sidelink information and the first target information are transmitted on the target resource, a mapping manner for mapping third multiplexing information to the target resource may be related to a third target parameter, where the third multiplexing information includes the first sidelink information and the first target information, and the third target parameter may include at least one of: a type of information transmitted on the target resource; an information type of the first sidelink information and an information type of the first target information; or a transmission priority of the first sidelink information and a transmission priority of the first target information.

In this embodiment, the foregoing information types may include a type such as the first sidelink information, the second sidelink information, or the uplink information. It should be noted that the foregoing information type may also be referred to as an interface type.

The mapping manner used to map the third multiplexing information to the target resource may be related to the type of the information transmitted on the target resource, and may include at least one of different mapping sequences, different mapping resource amounts, different mapping locations, or the like corresponding to different information types.

For example, the uplink information is mapped on a symbol L1 of the target resource, and the first sidelink information is mapped on a symbol L2 of the target resource, or the uplink information is first mapped on the target resource, and then the first sidelink information is mapped.

The information type may include at least one of HARQ-ACK information or CSI. The mapping manner used to map the third multiplexing information to the target resource may be related to the information type of the first sidelink information and the information type of the first target information, and may include at least one of different mapping sequences, different mapping resource amounts, different mapping locations, or the like corresponding to different information types.

For example, Uu HARQ-ACK information is mapped on a symbol U of the target resource, sidelink HARQ-ACK information is mapped on a symbol L2 of the target resource, Uu CSI is mapped on a symbol L3 of the target resource, and sidelink CSI is mapped on a symbol L4 of the target resource. For example, Uu HARQ-ACK information is first mapped, then Uu HARQ-ACK information and Uu CSI are mapped, and sidelink CSI is mapped.

The mapping manner used to map the third multiplexing information to the target resource may be related to the transmission priority of the first sidelink information and the transmission priority of the first target information, and may include at least one of different mapping sequences, different mapping resource amounts, different mapping locations, or the like corresponding to different transmission priorities.

For example, the first sidelink information is sidelink HARQ-ACK information and corresponds to transmission with a low priority, and the first target information is Uu HARQ-ACK information and corresponds to transmission with a high priority. In this case, Uu HARQ-ACK information corresponding to the transmission with the high priority is mapped to a symbol L1 of the target resource, and sidelink HARQ-ACK information corresponding to the transmission with the low priority is mapped to a symbol L2 of the target resource.

For example, the first sidelink information is sidelink HARQ-ACK information and corresponds to transmission with a low priority, and the first target information is Uu HARQ-ACK information and corresponds to transmission with a high priority. In this case, Uu HARQ-ACK information corresponding to the transmission with the high priority is mapped to a first symbol after a first demodulation reference signal (DMRS) symbol of the target resource, and sidelink HARQ-ACK information corresponding to the transmission with the low priority is mapped to other symbols without the DMRS.

As another example, the first sidelink information is sidelink HARQ-ACK information and corresponds to transmission with a low priority, and the first target information is Uu HARQ-ACK information and corresponds to transmission with a high priority. In this case, Uu HARQ-ACK information corresponding to the transmission with the high priority is mapped to K resource elements (RE) of the target resource, and sidelink HARQ-ACK information corresponding to the transmission with the low priority is mapped to L REs of the target resource, where both K and L are positive integers, and K>L.

Optionally, the mapping manner may include but is not limited to at least one of the following parameters: a mapping sequence, a mapping resource amount, or a mapping location.

Optionally, a transmission resource used for the first sidelink information may meet a resource restriction rule, and a transmission resource used for the first target information may meet the resource restriction rule, where the resource restriction rule includes at least one of:
a maximum of N transmission resources are included in one slot, and N is an integer greater than 1;
if there is a plurality of transmission resources exist, there are a maximum of M long format physical transmission resources in the plurality of transmission resources, where the physical transmission resource includes a physical uplink control channel PUCCH or a physical sidelink feedback channel PSFCH, and M is a positive integer; or
if there is a plurality of transmission resources, a maximum of O transmission resources in the plurality of transmission resources may be used to transmit HARQ-ACK information, and O is a positive integer.

In this embodiment, N, M, and O may be properly set based on an actual situation. For example, N is 2, M=1, and N=1. The long format physical transmission resource may include a long format PUCCH or a long format PSFCH. The long format physical transmission resource may be understood as that a quantity of time domain symbols occupied by the physical transmission resource is greater than a preset quantity of symbols, and the preset quantity of symbols may be reasonably set based on an actual situation. For example, the preset quantity of symbols is 2.

If there is a plurality of transmission resources exist, there are a maximum of M long format physical transmission resources in the plurality of transmission resources. For example, M=1. If the terminal device sends two PUCCHs in one slot, there must be at most one long format PUCCH in the two PUCCHs.

If there is a plurality of transmission resources, a maximum of O transmission resources in the plurality of transmission resources may be used to transmit HARQ-ACK information. For example, O=1. If the terminal device sends two PUCCHs in one slot, at most one of the two PUCCHs may be used for the HARQ-ACK information.

Optionally, a sixth resource does not need to meet the resource restriction rule, and the sixth resource includes a transmission resource used for the first sidelink information and a transmission resource used for the first target information.

In this embodiment, the transmission resource used for the first sidelink information and the transmission resource used for the first target information may not meet the foregoing resource restriction rule as a whole.

Optionally, in this embodiment, in a case that the transmission resource used for the first sidelink information and the transmission resource used for the first target information do not meet the foregoing preset multiplexing condition, the transmission resource used for the first sidelink information may meet the resource restriction rule, the transmission resource used for the first target information may meet the resource restriction rule, and the sixth resource does not need to meet the resource restriction rule.

For example, one slot includes three PUCCHs that do not overlap each other. The control node instructs the terminal device to transmit sidelink HARQ-ACK information on a PUCCH 1, transmit Uu HARQ-ACK information on a PUCCH 2, and transmit a Uu CSI report on a PUCCH 3. The terminal device transmits corresponding information on a corresponding resource according to an instruction of the control node. For the first sidelink information, the terminal device sends the first sidelink information on a maximum of two PUCCHs in one slot. If the first sidelink information is sent on two PUCCHs, there must be one short format PUCCH, and a maximum of one PUCCH may be used for the sidelink HARQ-ACK information.

Optionally, target information of the first sidelink information may be determined in one of the following manners:
determining the target information of the first sidelink information in a first manner, where the first manner includes at least one of: a configuration of the control node, a preconfiguration, a predefinition in a protocol, a negotiation between terminals, or an indication of a target terminal device; and the target terminal device is a terminal device other than the first terminal device; and
determining a target bit based on the first sidelink information, where
the target bit includes at least one of a check bit or a redundancy bit.

In this embodiment, the check bit may include a cyclic redundancy check (CRC) code. The target information of the first sidelink information may be determined independent of the first sidelink information, or may be related to the first sidelink information.

In an implementation, the target information of the first sidelink information may be configured by the control node, pre-configured, predefined by a protocol, negotiated between terminals, or indicated by a target terminal device, so that the determined target information can be inserted into the first sidelink information.

In another implementation, the target information of the first sidelink information may be determined based on the first sidelink information, and the determined target information may be inserted into the first sidelink information. For example, if the first sidelink information is 4 bit 0011, 4 and/or 0011 may be brought into a preset formula to generate a target bit, and the target bit is inserted into the first sidelink information.

Optionally, target information of the first sidelink information may be generated in the following manner:
separately generating the target bit for CSI and fifth information of the first sidelink information, where the fifth information is information in the first sidelink information other than the CSI; and
generating a target bit for each type of information in the first sidelink information, where
the target bit includes at least one of a check bit or a redundancy bit.

Optionally, in a case that the first sidelink information and the first target information are transmitted on the target transmission resource, a target bit of fourth multiplexing information may be generated in one of the following manners:
generating the target bit for the fourth multiplexing information;
if the first target information includes the uplink information and the uplink information includes a CSI second part, separately generating target bits for the CSI second part of the uplink information and sixth information, or generating target bits for the CSI second part of the uplink information and the first sidelink information, and generating a target bit for seventh information, where the sixth information is information in the fourth multiplexing information other than the CSI second part of the uplink information, and the seventh information is information in the fourth multiplexing information other than the CSI second part and the first sidelink information;

if the first target information includes the uplink information, separately generating target bits for first target CSI and eighth information, where the first target CSI includes at least one of CSI of the first sidelink information or CSI of the uplink information, and the eighth information is information in the fourth multiplexing information other than the first target CSI; and if the first target information includes the second sidelink information, separately generating target bits for second target CSI and ninth information, where the second target CSI includes at least one of CSI of the first sidelink information and CSI of the second sidelink information, and the ninth information is information in the fourth multiplexing information other than the second target CSI; and the target bit includes at least one of a check bit or a redundancy bit, and the fourth multiplexing information includes the first sidelink information and the first target information.

In this embodiment, the generating the target bit for the fourth multiplexing information may be generating the target bit for the first sidelink information and the first target information as a whole.

Optionally, the transmitting first sidelink information and first target information on a target resource, or prohibiting transmission of the first sidelink information and the first target information on a same transmission resource may include:

in a case that both the first sidelink information and the first target information include information of a first preset type, transmitting the information of the first preset type in the first sidelink information and the information of the first preset type in the first target information on the target resource; and in a case that both the first sidelink information and the first target information include information of a second preset type, prohibiting transmission of the information of the second preset type in the first sidelink information and the information of the second preset type in the first target information on the same transmission resource.

In this embodiment, the first preset type and the second preset type may be any different type. For example, the first preset type may be a HARQ-ACK information type, and the second preset type may be an SR type. In this way, the first terminal device may deem or expect that different transmission resources are configured for an SR in the first sidelink information and an SR in the first target information, and HARQ-ACK information in the first sidelink information and HARQ-ACK information in the first target information may be multiplexed.

In this embodiment of the present disclosure, in a case that both the first sidelink information and the first target information include the information of the first preset type, the information of the first preset type in the first sidelink information and the information of the first preset type in the first target information are transmitted on the target resource. In a case that both the first sidelink information and the first target information include the information of the second preset type, transmission of the information of the second preset type in the first sidelink information and the information of the second preset type in the first target information on the same transmission resource is prohibited. In this way, flexibility of information communication can be improved.

In actual application, in a case that the control node is a 4th-Generation (4G) base station or a Long Term Evolution (LTE) base station, the control node may schedule an NR sidelink or an LTE sidelink. When the control node schedules the NR sidelink, a resource of a transmission codebook is an LTE PUCCH or a PUSCH resource. In a case that the control node is a 5th-generation (5G) base station or a base station of a later release, the control node may schedule an NR sidelink or an LTE sidelink.

Optionally, if the first sidelink information and the first target information use different access technologies, multiplexing of the first sidelink information and the first target information is prohibited.

For example, if the first sidelink information is sidelink information of NR sidelink transmission, and the uplink information is uplink information corresponding to LTE Uu transmission, multiplexing is not allowed. Optionally, the base station may configure different resources for the uplink information and the first sidelink information.

Optionally, if the first sidelink information and the first target information use a same access technology, multiplexing of the first sidelink information and the first target information is allowed.

For example, if both the first sidelink information and the second sidelink information are sidelink information for NR sidelink transmission, that is, both use an NR technology, multiplexing is allowed. If the first sidelink information is sidelink information of NR sidelink transmission, and the uplink information is uplink information corresponding to NR Uu transmission, multiplexing is allowed.

It should be noted that, in this embodiment of the present disclosure, the foregoing implementations may be combined arbitrarily as required. This is not limited in this embodiment.

Figure 4:
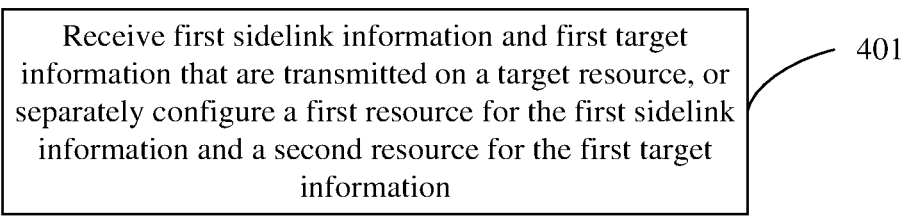
FIG. 4 is a flowchart of an information transmission method according to another embodiment of the present disclosure.

An embodiment of the present disclosure provides an information transmission method, applied to a control node. Referring to FIG. 4, FIG. 4 is a flowchart of an information transmission method according to an embodiment of the present disclosure. As shown in FIG. 4, the method includes the following steps.

Step 401: Receive first sidelink information and first target information that are transmitted on a target resource, or separately configuring a first resource for the first sidelink information and a second resource for the first target information.

The first sidelink information is sidelink information corresponding to sidelink transmission between a first terminal device and a second terminal device, the first target information includes uplink control information, uplink information, or second sidelink information, and the second sidelink information is sidelink information corresponding to sidelink transmission between the first terminal device and the control node; and the first resource and the second resource meet a resource configuration rule, and the resource configuration rule includes at least a rule that the first resource and the second resource do not overlap.

In this embodiment, the target resource may be any resource that can be used to transmit the first sidelink information and the first target information through multiplexing. For example, the target resource may be a resource configured to transmit the first sidelink information and the first target information through multiplexing, or the target resource may be a resource used to transmit the first sidelink information or a resource used to transmit the first target information. It should be noted that the target resource may include one or at least two transmission resources.

Both the first sidelink information and the second sidelink information may include at least one of HARQ-ACK information, CSI, an SR, or the like that are corresponding to sidelink transmission. The uplink information may include at least one of HARQ-ACK information, CSI, an SR, or the like for uplink transmission. The uplink transmission may be uplink transmission based on a Uu interface. The HARQ-ACK information may include an ACK or a NACK.

In an implementation, the control node may receive the first sidelink information and the first target information that are transmitted through multiplexing, thereby improving integrity of information transmission.

In another implementation, the control node may separately configure different transmission resources for the first sidelink information and the first target information, so that the first terminal device can transmit the first sidelink information and the first target information on different transmission resources, to avoid a resource conflict.

In this embodiment of the present disclosure, the control node receives the first sidelink information and the first target information that are transmitted through multiplexing, or separately configures the first resource for the first sidelink information and configures the second resource for the first target information, to provide a manner of transmitting the first sidelink information and the first target information in a case that the first sidelink information and the first target information need to be transmitted simultaneously, thereby facilitating information transmission control.

Optionally, the resource configuration rule may further include at least one of:
  a time interval between the first resource and the second resource is greater than a first preset time interval;
  a frequency domain gap between the first resource and the second resource is greater than a first preset frequency domain gap;
  the first resource and the second resource are in different time units; or
  the first resource and the second resource are in different frequency domain units.

In this embodiment, both the first preset time interval and the first preset frequency domain gap may be predefined by a protocol, pre-configured, configured by the control node, negotiated by terminals, or indicated by another terminal device, and the another terminal device may be a terminal device other than the first terminal device.

The time unit may be properly set based on an actual requirement, for example, may be a slot or a subslot. The frequency domain unit may also be properly set based on an actual requirement, for example, may be a 10 MHZ.

In this embodiment of the present disclosure, the control node may configure that the first resource and the second resource meet the resource configuration rule. In this way, the first sidelink information and the first target information can be transmitted separately, thereby improving reliability of information transmission.

Optionally, the target resource may include one of the following:
  a transmission resource used to transmit the first sidelink information and the first target information through multiplexing;
  a transmission resource indicated by the latest sent scheduling signaling;
  a transmission resource closest to a target moment, where the target moment is a moment at which the first sidelink information and the first target information are transmitted through multiplexing;
  a transmission resource used for the first sidelink information;
  a transmission resource determined based on at least one of the first sidelink information or the first target information; and
  a transmission resource determined based on at least one of a resource type of a transmission resource used for the first sidelink information or a resource type of a transmission resource used for the first target information.

In this embodiment, the obtained used to transmit the first sidelink information and the first target information through multiplexing may be a transmission resource dedicated to transmit the first sidelink information and the first target information through multiplexing The determining the target resource based on at least one of the first sidelink information or the first target information may be, for example, determining the target resource based on at least one of a data volume of the first sidelink information or a data volume of the first target information, or determining the target resource based on at least one of an information type of the first sidelink information or an information type of the first target information. The information type may include but is not limited to a type such as HARQ-ACK information, CSI, or an SR.

The resource types may be classified based on one or more dimensions. For example, different resource types may be classified based on one or more of a resource format, a bearer size, a time domain length, and a quantity of resources occupied in frequency domain. For example, for PUCCHs in formats such as a PUCCH Format 0, a PUCCH Format 1, a PUCCH Format 2, a PUCCH Format 3, and a PUCCH Format 4 may respectively represent different types of resources.

Optionally, the target resource is a transmission resource determined based on an information type of at least one of the first sidelink information or the first target information.

For example, if the first sidelink information is HARQ-ACK information and the uplink information is CSI, or the first sidelink information is CSI and the uplink information is HARQ-ACK information, it may be determined that a transmission resource corresponding to the CSI is the target resource.

As another example, if the first sidelink information is HARQ-ACK information and the uplink information is an SR, or the first sidelink information is an SR and the uplink information is HARQ-ACK information, it may be determined that a transmission resource corresponding to the HARQ-ACK information is the target resource.

For example, if the first sidelink information is HARQ-ACK information and the uplink information is an SR, or the first sidelink information is an SR and the uplink information is HARQ-ACK information, and the SR is positive (being used to indicate that scheduling needs to be required), it may be determined that a transmission resource corresponding to the SR is the target resource.

As another example, if the first sidelink information is CSI and the uplink information is an SR, or the first sidelink information is an SR and the uplink information is CSI, a transmission resource corresponding to the CSI may be determined as the target resource.

Optionally, the target resource includes a transmission resource selected based on a data volume of the first sidelink information and the first target information.

Optionally, an amount of data that can be transmitted on the target resource is greater than or equal to a first data volume; and the first data volume is a total data volume before the first sidelink information and the first target information are multiplexed, or a total data volume after the first sidelink information and the first target information are multiplexed.

Optionally, the target resource is a transmission resource corresponding to a smallest difference between an amount of data that can be transmitted and the first data volume in transmission resources for which an amount of data that can be transmitted is greater than or equal to a target data volume.

Optionally, the receiving first sidelink information and first target information that are transmitted on a target resource includes:

receiving first multiplexing information transmitted on the target resource, where
the first multiplexing information includes one of the following:
information obtained by performing a cascade operation or an AND operation on second target information and the third target information;
information obtained by separately cascading information of a first type in the second target information and the third target information and performing an AND operation on information of a second type in the second target information and the third target information; and
information obtained by cyclically shifting one of the second target information and the third target information based on a target cyclic shift amount, where the target cyclic shift amount is determined based on the other of the second target information and the third target information or based on the second target information and the third target information; and
the second target information includes at least a part of the first sidelink information, and the third target information includes at least a part of the first target information.

In actual application, in a process of multiplexing the first sidelink information and the first target information, a part of at least one of the first sidelink information or the first target information may also be discarded. Therefore, the first multiplexing information may be determined based on at least a part of information (the second target information) in the first sidelink information and at least a part of information (the third target information) in the first target information.

In an implementation, the second target information and the third target information may be cascaded to obtain the first multiplexing information.

Optionally, in this implementation, the second target information and the third target information may be directly cascaded without considering information types of the second target information and the third target information; or the second target information and the third target information may be cascaded based on information types of the second target information and the third target information.

In another implementation, the AND operation may be performed on the second target information and the third target information to obtain the first multiplexing information.

The AND operation may include AND or bitwise AND.

In this implementation, the AND operation may be directly performed on the second target information and the third target information without considering information types of the second target information and the third target information; or the AND operation may be performed on the second target information and the third target information based on information types of the second target information and the third target information.

Optionally, the first multiplexing information may include information obtained by performing an AND operation on information of a same type in the second target information and the third target information. That is, the first multiplexing information is obtained by performing the AND operation on the information of the same type in the second target information and the third target information.

Optionally, if information types of the second target information and the third target information are the same, and transmission corresponding to the second target information and transmission corresponding to the third target information meet a preset condition, the AND operation is performed on the second target information and the third target information to obtain the first multiplexing information. The preset condition may be, for example, that the transmission corresponding to the second target information and the transmission corresponding to the third target information are located in a same time unit, or that there is a resource overlap between the transmission corresponding to the second target information and the transmission corresponding to the third target information.

In another implementation, the information of the first type in the second target information and the third target information may be separately cascaded and the AND operation may be performed on the information of the second type in the second target information and the third target information to obtain the first multiplexing information. The first type and the second type may be any two different information types.

For example, if the first type may be a HARQ-ACK information type, and the second type may be a CSI type, HARQ-ACK information in the second target information and HARQ-ACK information in the third target information may be cascaded, and the AND operation may be performed on CSI in the second target information and CSI in the third target information. If the first type may be a CSI type, and the second type may be a HARQ-ACK information type, CSI in the second target information and CSI in the third target information may be cascaded, and the AND operation may be performed on HARQ-ACK information in the second target information and HARQ-ACK information in the third target information.

In another implementation, one of the second target information and the third target information may be cyclically shifted based on the target cyclic shift amount to obtain the first multiplexing information. For example, the second target information may be cyclically shifted based on the target cyclic shift amount to obtain the first multiplexing information, where the target cyclic shift amount is determined based on the third target information, or is determined based on the third target information and the second target information; or the third target information may be cyclically shifted based on the target cyclic shift amount to obtain the first multiplexing information, where the target cyclic shift amount is determined based on the second target information, or is determined based on the second target information and the third target information.

Optionally, the first multiplexing information includes one of the following:

information obtained by cascading the second target information and the third target information as a whole; and information obtained by cascading information of a same type in the second target information and the third target information, and cascading each obtained cascading result.

In an implementation, the first multiplexing information may be the information obtained by cascading the second target information and the third target information as a whole. For example, if the second target information includes sidelink HARQ-ACK information and the third target information includes Uu CSI, the first multiplexing information may be information obtained by cascading the sidelink HARQ-ACK information and the Uu CSI. If the second target information includes sidelink HARQ-ACK information and sidelink CSI, and the third target information includes Uu CSI, the first multiplexing information may be information obtained by cascading the sidelink HARQ-ACK information and the sidelink CSI as a whole with the Uu CSI.

In another implementation, the first multiplexing information may be the information obtained by cascading the information of the same type in the second target information and the third target information, and cascading each obtained cascading result. For example, if the second target information includes sidelink HARQ-ACK information and sidelink CSI, and the third target information includes Uu HARQ-ACK information and Uu CSI, the first multiplexing information may be information obtained by separately cascading the sidelink HARQ-ACK information and the Uu HARQ-ACK information to obtain a first cascading result, cascading the sidelink CSI and the Uu CSI to obtain a second cascading result, and cascading the first cascading result and the second cascading result.

Optionally, the first multiplexing information may include:

information obtained by cascading the second target information and the third target information in a cascading sequence, where the cascading sequence is determined based on at least one of an information type of the second target information or an information type of the third target information, or is determined based on a resource type of the target resource.

In this embodiment, the information type may include but is not limited to a type such as HARQ-ACK information, CSI, or an SR. The resource types may be classified based on one or more dimensions. For example, different resource types may be classified based on one or more of a resource format, a bearer size, a time domain length, and a quantity of resources occupied in frequency domain. For example, for PUCCHs in formats such as a PUCCH Format 0, a PUCCH Format 1, a PUCCH Format 2, a PUCCH Format 3, and a PUCCH Format 4 may respectively represent different types of resources.

The foregoing cascading sequence is used to indicate a location of the second target information and the third target information in a cascading process. For example, the cascading sequence is used to indicate that the second target information is placed behind the third target information, or the cascading sequence is used to indicate that the third target information is placed behind the second target information.

For example, if the second target information includes sidelink HARQ-ACK information, and the third target information includes Uu CSI, the cascading sequence may be that the sidelink HARQ-ACK information is located before the Uu CSI. If the second target information includes sidelink CSI, and the third target information includes the Uu HARQ-ACK information, the cascading sequence may be that the Uu HARQ-ACK information is located before the sidelink CSI.

As another example, if the second target information includes sidelink HARQ-ACK information, and the third target information includes a Uu SR, the cascading sequence may be that the sidelink HARQ-ACK information is located before the Uu SR. If the second target information includes a sidelink SR, and the third target information includes Uu HARQ-ACK information, the cascading sequence may be that the Uu HARQ-ACK information is located before the sidelink SR.

As another example, if the second target information includes sidelink CSI, and the third target information includes a Uu SR, the cascading sequence may be that the sidelink CSI is located after the Uu SR. If the second target information includes a sidelink SR, and the third target information includes Uu CSI, the cascading sequence may be that the Uu CSI is located after the sidelink SR.

As another example, if the second target information includes sidelink CSI, and the third target information includes Uu CSI, the cascading sequence may be that the sidelink CSI is located before or after the Uu CSI.

As another example, if the second target information includes sidelink HARQ-ACK information, and the third target information includes Uu HARQ-ACK information, the cascading sequence may be that the Sidelink HARQ-ACK information is located before or after the Uu HARQ-ACK information.

As another example, if the second target information includes a sidelink SR, and the third target information includes a Uu SR, the cascading sequence may be that the sidelink SR is located before or after the Uu SR.

As another example, if the target resource is a PUCCH resource, the cascading sequence may be that information corresponding to the PUCCH resource in the second target information and the third target information is located after the other piece of information.

It should be noted that the cascading sequences in the foregoing examples may be properly combined based on an actual requirement. For example, if a cascading sequence a1 is that Uu HARQ-ACK information is located before a sidelink SR, and a cascading sequence a2 is that the sidelink SR is located before Uu CSI information, a combined cascading sequence may be obtained, that is, the Uu HARQ-ACK information is located before the sidelink SR, and the sidelink SR is located before the Uu CSI information.

Optionally, in a case that the first sidelink information is received on a fifth resource, each type of information in the first sidelink information is mapped to the fifth resource in a first mapping manner, where the first mapping manner is a mapping manner of any type of information in the uplink information; or in a case that the first sidelink information is received on a fifth resource, third information in the first sidelink information is mapped to the fifth resource in a second mapping manner, where the second mapping manner is a mapping manner of information of the same type as the third information in the uplink information, and the third information is any type of information in the first sidelink information.

In this embodiment, the fifth resource may be any transmission resource for transmitting the first sidelink information. For example, in a case that the first sidelink information and the first target information are not multiplexed, the fifth resource may be a transmission resource used for the first sidelink information, and in a case that the first sidelink information and the first target information are multiplexed, the fifth resource may be the target resource.

In an implementation, all of the first sidelink information may be mapped to the second resource in a first mapping manner. The first mapping manner may be a mapping manner of any type of information in the uplink information, such as a mapping manner of Uu CSI part 2, a mapping manner of Uu CSI part 1, or a mapping manner of Uu HARQ-ACK information.

In another implementation, each type of information in the first sidelink information may be separately mapped to the fifth resource in a mapping manner of information of the same type in the uplink information. For example, sidelink CSI is mapped in a mapping manner of Uu CSI, and the sidelink CSI is mapped in on a mapping manner of Uu CSI part 2; and sidelink HARQ-ACK information is mapped in a mapping manner of Uu HARQ-ACK information.

Optionally, in a case that the first sidelink information and the first target information are transmitted on the target resource, fourth information in second multiplexing information is mapped to the target resource in a third mapping manner, where
the second multiplexing information includes the first sidelink information and the first target information, the third mapping manner is a mapping manner of information of the same type as the fourth information in the uplink information, and the fourth information is any type of information in the first sidelink information.

In this embodiment, a mapping manner of the second multiplexing information may be independent of an information type. For example, in a case that the first sidelink information and the first target information are transmitted on the target resource through multiplexing, each type of information in the second multiplexing information may be mapped in a mapping manner of information of the same type in the uplink information. For example, if the first sidelink information is sidelink CSI and the first target information is Uu CSI, both CSI of the first sidelink information and CSI of the first target information may be used as CSI, and mapping is performed in a mapping manner of Uu CSI; or both HARQ-ACK information of the first sidelink information and HARQ-ACK information in the first target information may be used as HARQ-ACK information, and mapping is performed in a mapping manner of Uu HARQ-ACK information.

Optionally, in a case that the first sidelink information and the first target information are transmitted on the target resource, a mapping manner for mapping third multiplexing information to the target resource is related to a third target parameter, where
the third multiplexing information includes the first sidelink information and the first target information, and the third target parameter includes at least one of:
a type of information transmitted on the target resource;
an information type of the first sidelink information and an information type of the first target information; or
a transmission priority of the first sidelink information and a transmission priority of the first target information.

In this embodiment, the foregoing information types may include a type such as the first sidelink information, the second sidelink information, or the uplink information. It should be noted that the foregoing information type may also be referred to as an interface type. The mapping manner used to map the third multiplexing information to the target resource may be related to the type of the information transmitted on the target resource, and may include at least one of different mapping sequences, different mapping resource amounts, different mapping locations, or the like corresponding to different information types.

For example, the uplink information is mapped on a symbol L1 of the target resource, and the first sidelink information is mapped on a symbol L2 of the target resource, or the uplink information is first mapped on the target resource, and then the first sidelink information is mapped.

The information type may include at least one of HARQ-ACK information or CSI. The mapping manner used to map the third multiplexing information to the target resource may be related to the information type of the first sidelink information and the information type of the first target information, and may include at least one of different mapping sequences, different mapping resource amounts, different mapping locations, or the like corresponding to different information types.

For example, Uu HARQ-ACK information is mapped on a symbol L1 of the target resource, sidelink HARQ-ACK information is mapped on a symbol L2 of the target resource, Uu CSI is mapped on a symbol L3 of the target resource, and sidelink CSI is mapped on a symbol L4 of the target resource. For example, Uu HARQ-ACK information is first mapped, then Uu HARQ-ACK information and Uu CSI are mapped, and sidelink CSI is mapped.

The mapping manner used to map the third multiplexing information to the target resource may be related to the transmission priority of the first sidelink information and the transmission priority of the first target information, and may include at least one of different mapping sequences, different mapping resource amounts, different mapping locations, or the like corresponding to different transmission priorities.

For example, the first sidelink information is sidelink HARQ-ACK information and corresponds to transmission with a low priority, and the first target information is Uu HARQ-ACK information and corresponds to transmission with a high priority. In this case, Uu HARQ-ACK information corresponding to the transmission with the high priority is mapped to a symbol L1 of the target resource, and sidelink HARQ-ACK information corresponding to the transmission with the low priority is mapped to a symbol L2 of the target resource.

For example, the first sidelink information is sidelink HARQ-ACK information and corresponds to transmission with a low priority, and the first target information is Uu HARQ-ACK information and corresponds to transmission with a high priority. In this case, Uu HARQ-ACK information corresponding to the transmission with the high priority is mapped to a first symbol after a first DMRS symbol of the target resource, and sidelink HARQ-ACK information corresponding to the transmission with the low priority is mapped to other symbols without the DMRS.

As another example, the first sidelink information is sidelink HARQ-ACK information and corresponds to transmission with a low priority, and the first target information is Uu HARQ-ACK information and corresponds to transmission with a high priority. In this case, Uu HARQ-ACK information corresponding to the transmission with the high priority is mapped to K REs of the target resource, and sidelink HARQ-ACK information corresponding to the transmission with the low priority is mapped to L REs of the target resource, where both K and L are positive integers, and K>L.

Optionally, the mapping manner includes at least one of the following parameters: a mapping sequence, a mapping resource amount, or a mapping location.

It should be noted that, in this embodiment of the present disclosure, the foregoing implementations may be combined arbitrarily as required. This is not limited in this embodiment.

The following describes this embodiment of the present disclosure with reference to examples:

In Example 1, at least a part of the first sidelink information and the first target information is discarded.

It should be noted that, for ease of description, the following uses the first target information as an example of the uplink information for description.

Optionally, the discarding at least a part of the first sidelink information and the uplink information may include one of the following:

preferentially discarding the first sidelink information;

preferentially discarding the first target information; and preferentially discarding the first sidelink information in a specific case; otherwise, preferentially discarding the first target information. For example, if the first target information is the uplink information, the first sidelink information may be preferentially discarded in a case that Uu transmission corresponding to the uplink information is random access information, for example, a Msg1, a Msg3, or HARQ-ACK information retransmitted by using a Msg3 (for example, in a contention-based random access handover process).

Optionally, the discarding at least a part of the first sidelink information and the uplink information may further include one of the following manners.

Manner 1: Discarded information is determined based on a transmission sequence.

For example, the discarded information is determined based on target transmission that starts at the latest or ends at the latest. Information corresponding to transmission earlier than the target transmission may be discarded. For example, if transmission that ends at the last end is sidelink transmission, at least a part of uplink information and/or sidelink information transmitted earlier than the sidelink transmission may be discarded; or information that is corresponding to transmission earlier than the target transmission and has a different information type may be discarded may be discarded. For example, if the last transmission is sidelink transmission, at least a part of uplink information transmitted earlier than the sidelink transmission may be discarded.

Manner 2: Discarded information is determined based on a sequence of scheduling signaling corresponding to transmission.

For example, the last received scheduling signaling indicates that the target resource is used for the first sidelink information, at least a part of the first target information is discarded, and if the last received scheduling signaling indicates that the target resource is used for the first target information, at least a part of the first sidelink information is discarded.

Manner 3: Discarded information is determined based on the information type of the first sidelink information and the information type of the first target information.

Optionally, if at least a part of the first sidelink information and the first target information corresponds to a same type, the same type of information in the first sidelink information or the first target information may be discarded; otherwise, multiplex transmission is performed.

For example, if the uplink information includes Uu HARQ-ACK information, and the first sidelink information includes sidelink HARQ-ACK information, at least the sidelink HARQ-ACK information is discarded.

As another example, if the uplink information includes a Uu SR, and the first sidelink information includes a sidelink SR, at least the sidelink SR is discarded.

As another example, if the uplink information includes Uu CSI, and the first sidelink information includes sidelink CSI, at least the sidelink CSI is discarded.

As another example, if the uplink information includes Uu CSI, and the first sidelink information includes sidelink CSI, at least one of the following may be included:

if the first sidelink information includes sidelink SR CSI and the uplink information includes a Uu CSI part 2, the Uu CSI part 2 is discarded;

if the first sidelink information includes sidelink SR CSI and the uplink information includes a Uu CSI part 1, the sidelink CSI may be discarded; or if the first sidelink information includes sidelink SR CSI and the uplink information includes a Uu CSI part 1 and a Uu CSI part 2, the sidelink CSI may be discarded.

Optionally, if at least a type of a part of the uplink information is different from that of at least a part of the first sidelink information, at least one of the following may be included:

if the first sidelink information includes a sidelink SR and the uplink information includes Uu CSI, the Uu CSI may be discarded;

if the uplink information includes a Uu SR and the first sidelink information includes sidelink CSI, the sidelink CSI is discarded;

if the first sidelink information includes sidelink CSI and the uplink information includes Uu HARQ-ACK information, the sidelink CSI may be discarded;

if the uplink information includes Uu CSI and the first sidelink information includes sidelink HARQ-ACK information, the Uu CSI may be discarded;

if the first sidelink information includes a sidelink SR and the uplink information includes Uu HARQ-ACK information, when all the HARQ-ACK information indicates an ACK, the Uu HARQ-ACK information is discarded, or when at least 1 bit of the HARQ-ACK information indicates a NACK, the sidelink SR is discarded; or if the uplink information includes a Uu SR and the first sidelink information includes sidelink HARQ-ACK information, when all the HARQ-ACK information indicates an ACK, the sidelink HARQ-ACK information is discarded, or when at least 1 bit of the HARQ-ACK information indicates a NACK, the Uu SR is discarded.

Manner 4: Discarded information is determined based on Uu transmission corresponding to the uplink information and a sidelink transmission requirement and/or a Qos requirement related parameter corresponding to the first sidelink information. The related parameter may include but is not limited to a communication range, a latency requirement, a reliability requirement, a data rate requirement, a payload, a transmission priority, and quality of a sidelink and a Uu link.

For example, feature parameters of Uu transmission corresponding to the uplink information and sidelink transmission corresponding to the first sidelink information may be compared, and discarded information is determined based on a comparison result. For example, information corresponding to transmission with a low requirement is discarded, or information corresponding to transmission with a low transmission priority is discarded, and information corresponding to transmission with good link quality is discarded.

Optionally, after the discarded information is determined, if both the fourth target information and the fifth target information have respective transmission resources, when the first terminal device determines to discard the fourth target information, the first terminal device may send the fifth target information on the transmission resource corresponding to the fourth target information, so that the control node can learn, through the transmission resource of the received fifth target information, that the first terminal device intends to send the fourth target information. However, because the fourth target information is discarded due to a rule limitation, a resource may be further allocated to a report of the fourth target information.

One of the fourth target information and the fifth target information is the first sidelink information, and the other is the first target information.

It should be noted that, in a case that the first target information is the second sidelink information, a manner of discarding at least a part of the first sidelink information and the second sidelink information is the same as the foregoing manner of discarding at least a part of the first sidelink information and the uplink information. To avoid repetition, details are not described herein again.

Example 2 shows a multiplexing procedure of the first sidelink information and the first target information when information types of the first sidelink information and the first target information are different.

It should be noted that, for ease of description, the following uses the first target information as an example of the uplink information for description.

Optionally, if the information types of the first sidelink information and the first target information are different and multiplex sending may be performed, at least one of the following cases may be included.

Case 1: The first sidelink information is sidelink HARQ-ACK information, and the first target information is Uu CSI, or the first sidelink information is sidelink CSI, and the first target information is Uu HARQ-ACK information.

Optionally, if there is no corresponding scheduling signaling for transmission corresponding to the sidelink HARQ-ACK information, the target resource may be determined as a transmission resource corresponding to the Uu CSI, or if there is no corresponding scheduling signaling for transmission corresponding to the Uu HARQ-ACK information, the target resource may be determined as a transmission resource corresponding to the sidelink CSI.

Optionally, if there is no corresponding scheduling signaling for transmission corresponding to the sidelink HARQ-ACK information, in a case that the sidelink HARQ-ACK information and the Uu CSI are cascaded, the sidelink HARQ-ACK information is placed before the Uu CSI, or if there is no corresponding scheduling signaling for transmission corresponding to the Uu HARQ-ACK information, in a case that the Uu HARQ-ACK information and the sidelink CSI are cascaded, the Uu HARQ-ACK information is placed before the sidelink CSI.

Optionally, if the sidelink HARQ-ACK information corresponds to transmission on a sidelink configured grant, the target resource may be determined as a transmission resource corresponding to the Uu CSI.

Optionally, if the sidelink HARQ-ACK information corresponds to transmission on a sidelink configured grant, in a case that the sidelink HARQ-ACK information and the Uu CSI are cascaded, the sidelink HARQ-ACK information is placed before the Uu CSI.

Optionally, if the Uu HARQ-ACK information corresponds to a semi-persistent scheduling (SPS) PDSCH, the target resource may be determined as a transmission resource corresponding to the sidelink CSI.

Optionally, if the Uu HARQ-ACK information corresponds to an SPS PDSCH, in a case that the Uu HARQ-ACK information and the sidelink CSI are cascaded, the Uu HARQ-ACK information is placed before the sidelink CSI.

Optionally, if there is corresponding scheduling signaling for transmission corresponding to the sidelink HARQ-ACK information, it may be determined that the target resource is a transmission resource that is used for the Uu CSI and that is indicated by the latest received scheduling signaling; or if there is corresponding scheduling signaling for transmission corresponding to the Uu HARQ-ACK information, it may be determined that the target resource is a transmission resource that is used for the sidelink CSI and that is indicated by the latest received scheduling signaling.

Optionally, if there is corresponding scheduling signaling for transmission corresponding to the sidelink HARQ-ACK information, in a case that the sidelink HARQ-ACK information and the Uu CSI are cascaded, the sidelink HARQ-ACK information is placed before the Uu CSI, or if there is corresponding scheduling signaling for transmission corresponding to the sidelink HARQ-ACK information, in a case that the Uu HARQ-ACK information and the sidelink CSI information are cascaded, the Uu HARQ-ACK information is placed before the sidelink CSI.

Case 2: The first sidelink information is sidelink HARQ-ACK information, and the first target information is a Uu SR, or the first sidelink information is a sidelink SR, and the first target information is Uu HARQ-ACK information.

Optionally, if the HARQ-ACK information corresponds to a PUCCH resource and a format is a Format 2, a Format 3, or a Format 4, the target resource is determined as the PUCCH resource corresponding to the HARQ-ACK information.

Optionally, if the HARQ-ACK information corresponds to a PUCCH resource and a format is a Format 2, a Format 3, or a Format 4, the SR is placed after the HARQ-ACK information during cascading. That is, in a case that the sidelink HARQ-ACK information and the Uu SR are cascaded, the Uu SR is placed after the sidelink HARQ-ACK information, and in a case that the Uu HARQ-ACK information and the sidelink SR are cascaded, the sidelink SR is placed after the Uu HARQ-ACK information.

Optionally, if the HARQ-ACK information corresponds to a PUCCH resource and a format is a Format 0, and the SR corresponds to a PUCCH resource and a format is a Format 0 or a Format 1, the target resource may be determined as the PUCCH resource corresponding to the HARQ-ACK information.

Optionally, if the HARQ-ACK information corresponds to a PUCCH resource and a format is a Format 0, and the SR corresponds to a PUCCH resource and a format is a Format 0 or a Format 1, a cyclic shift of a sequence may be adjusted based on a value of the Uu SR/sidelink SR, to obtain the first multiplexing information.

Optionally, if the HARQ-ACK information corresponds to a PUCCH resource and a format is a Format 1, and the SR corresponds to a PUCCH resource and a format is a Format 0, the target resource may be determined as the PUCCH resource corresponding to the HARQ-ACK information.

Optionally, if the HARQ-ACK information corresponds to a PUCCH resource and a format is a Format 1, and the SR corresponds to a PUCCH resource and a format is a Format 0, the Uu SR/sidelink SR may be discarded.

Optionally, if the HARQ-ACK information corresponds to a PUCCH resource and a format is a Format 1, the SR corresponds to a PUCCH resource and a format is a Format 0, and the SR is positive, the sidelink HARQ-ACK information/Uu HARQ-ACK information may be sent on a transmission resource corresponding to the SR; otherwise, the sidelink HARQ-ACK information/Uu HARQ-ACK information may be sent on a transmission resource corresponding to the HARQ-ACK information.

Case 3: The first sidelink information is sidelink CSI, and the first target information is a Uu SR, or the first sidelink information is a sidelink SR, and the first target information is Uu CSI.

Optionally, if the CSI corresponds to a PUCCH resource and a format is a Format 2, a Format 3, or a Format 4, the target resource may be determined as the PUCCH resource corresponding to the CSI.

Optionally, if the CSI corresponds to a PUCCH resource and a format is a Format 2, a Format 3, or a Format 4, the SR is placed before the CSI during cascading. That is, in a case that the sidelink CSI and the Uu SR are cascaded, the Uu SR is placed before the sidelink CSI, and in a case that the Uu CSI and the sidelink SR are cascaded, the sidelink SR is placed before the Uu CSI.

It should be noted that, an example in which the first target information is the uplink information is used for description in this embodiment. A case that the first target information is the second sidelink information may also be applied to the foregoing multiplexing procedure. The involved PUCCH is correspondingly replaced with a PSFCH. To avoid repetition, details are not described in this embodiment.

Example 3 shows a multiplexing procedure of the first sidelink information and the first target information when information types of the first sidelink information and the first target information are the same.

It should be noted that, for ease of description, the following uses the first target information as an example of the uplink information for description.

Optionally, if the information types of the first sidelink information and the first target information are the same and multiplex sending may be performed, at least one of the following cases may be included.

Case 1: The first sidelink information is sidelink HARQ-ACK information, and the first target information is Uu HARQ-ACK information.

Optionally, if sidelink transmission corresponding to the sidelink HARQ-ACK information and Uu transmission corresponding to the Uu HARQ-ACK information meet the preset multiplexing condition, for example, are in a same time unit (for example, a slot or a subslot) or a same frequency domain unit, or have a resource overlap, an AND operation is performed on bits of the sidelink HARQ-ACK information and bits of the Uu HARQ-ACK information to obtain multiplexed HARQ-ACK information corresponding to the Uu transmission and the sidelink transmission.

Optionally, the foregoing preset condition may further include that the sidelink transmission and the Uu transmission are in a same transmission manner. For example, both the sidelink transmission and the Uu transmission are single-TB transmission, or both are 2TB transmission, or both are CBG transmission.

For example, when both sidelink transmission and Uu transmission in a same slot are single-TB transmission or 2TB transmission and feedback information is spatially multiplexed, each transmission corresponds to one sidelink HARQ-ACK information bit or Uu HARQ-ACK information bit, and a bitwise AND operation is performed on these bits to obtain one multiplexed HARQ-ACK information bit corresponding to these transmissions.

As another example, when both sidelink transmission and Uu transmission in a same slot are 2TB transmission and feedback information is not spatially multiplexed, each transmission corresponds to two sidelink HARQ-ACK information bits or Uu HARQ-ACK information bits, and a bitwise AND operation is performed on these bits to obtain two multiplexed HARQ-ACK information bits corresponding to these transmissions.

As another example, both sidelink transmission and Uu transmission in a same slot are 1TB transmission and are configured as CBG transmission, and a quantity of actually transmitted CBGs included in one TB is $N_1$ or a maximum quantity of CBGs is $N_1$, each transmission corresponds to $N_1$ sidelink HARQ-ACK information bits or Uu HARQ-ACK information bits, and a bitwise AND operation is performed on the $N_1$ bits to obtain multiplexed $N_1$ HARQ-ACK information bits corresponding to these transmissions.

As another example, both sidelink transmission and Uu transmission in a same slot are 2TB transmission and are configured as CBG transmission, and a quantity of actually transmitted CBGs included in one TB is $N_2$ or a maximum quantity of CBGs is $N_2$, each transmission corresponds to $2N_2$ sidelink HARQ-ACK information bits or Uu HARQ-ACK information bits, and a bitwise AND operation is performed on the $2N_2$ bits to obtain multiplexed $2N_2$ HARQ-ACK information bits corresponding to these transmissions.

As another example, both sidelink transmission and Uu transmission in a same slot are CBG transmission. However, a quantity of actually transmitted CBGs included in one TB or a maximum quantity of CBGs is different for different transmission, for example, is {N1, N2, N3 . . . }, and each transmission corresponds to N1/N2/N3 . . . sidelink HARQ-ACK information bits or Uu HARQ-ACK information bits.

Optionally, Nmax=max {N1, N2, N3 . . . }, and sidelink HARQ-ACK information bits or Uu HARQ-ACK information bits corresponding to each transmission may be supplemented to Nmax bits. For example, corresponding N1 sidelink HARQ-ACK information bits are supplemented with (Nmax-N1) bit. For example, an (Nmax-N1)-bit NACK is supplemented or an (Nmax-N1)-bit ACK is supplemented or an (Nmax-N1)-bit occupancy information symbol is supplemented or (Nmax-N1)-bit redundant information is supplemented, and a bitwise AND operation is performed on these Nmax bits to obtain multiplexed Nmax HARQ-ACK information bits corresponding to these transmissions.

Optionally, in a case that the sidelink transmission and the Uu transmission are in different transmission manners, the sidelink HARQ-ACK information and the Uu HARQ-ACK information may also be multiplexed.

Optionally, if one of the sidelink transmission and the Uu transmission corresponds to a CBG and a maximum quantity of CBGs included in one TB is $N_3$, the other transmission corresponds to 1TB or 2TB and corresponds to $A_1$-bit HARQ-ACK information, transmission corresponding to the CBG includes 1TB, and all $N_3$-bit HARQ-ACK information corresponds to the actually transmitted CBG is an ACK, the information is mapped to $A_1$-bit HARQ-ACK information; otherwise, the information is mapped to an $A_1$-bit NACK. A bitwise AND operation is performed on the $A_1$ bits to obtain multiplexed $A_1$ HARQ-ACK information bits corresponding to these transmissions.

Optionally, if one of the sidelink transmission and the Uu transmission corresponds to a CBG and a maximum quantity of CBGs included in one TB is $N_3$, the other transmission corresponds to 1TB or 2TB and corresponds to $A_1$-bit HARQ-ACK information, transmission corresponding to the CBG includes 2TB, and all $N_3$-bit HARQ-ACK information corresponds to the actually transmitted CBG is an ACK, the information is mapped to an $A_1$-bit ACK; otherwise, the information is mapped to an $A_1$-bit NACK. A bitwise AND operation is performed on the $A_1$-bit information obtained after the mapping and the HARQ-ACK information corresponding to the other transmission to obtain multiplexed $A_1$ HARQ-ACK information bits corresponding to these transmissions.

Optionally, if no CBG is configured for the sidelink transmission and the Uu transmission, one of the sidelink transmission and the Uu transmission corresponds to 1-bit HARQ-ACK information, and the other corresponds to 2-bit HARQ-ACK information, in a case that the 1-bit HARQ-ACK information is an ACK, the information is mapped to 2-bit ACK information; otherwise, the information is mapped to a 2-bit NACK. A bitwise AND operation is performed on the 2 bits to obtain multiplexed two HARQ-ACK information bits corresponding to these transmissions.

It should be noted that, an example in which the first target information is the uplink information is used for description in this embodiment. A case that the first target information is the second sidelink information may also be applied to the foregoing multiplexing procedure. To avoid repetition, details are not described in this embodiment.

Figure 5:
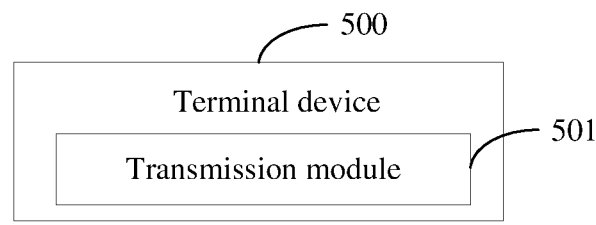
FIG. 5 is a structural diagram of a terminal device according to an embodiment of the present disclosure.

Referring to FIG. 5, FIG. 5 is a structural diagram of a terminal device according to an embodiment of the present disclosure. The terminal device is a first terminal device. As shown in FIG. 5, a terminal device 500 includes:

a transmission module 501, configured to transmit first sidelink information and first target information on a target resource, or prohibit transmission of the first sidelink information and the first target information on a same transmission resource, where the first sidelink information is sidelink information corresponding to sidelink transmission between the first terminal device and a second terminal device, the first target information includes uplink information or second sidelink information, and the second sidelink information is sidelink information corresponding to sidelink transmission between the first terminal device and a control node.

Optionally, the transmission module is configured to:
transmit the first sidelink information on a first resource and transmitting the first target information on a second resource in a case that the first resource and the second resource meet a resource configuration rule; or
discard at least one of the first sidelink information or the first target information in a case that a first resource and a second resource do not meet a resource configuration rule, where
the first resource is a transmission resource used for the first sidelink information, the second resource is a transmission resource used for the first target information, and the resource configuration rule includes at least a rule that the first resource and the second resource do not overlap.

Optionally, the resource configuration rule further includes at least one of:
a time interval between the first resource and the second resource is greater than a first preset time interval;
a frequency domain gap between the first resource and the second resource is greater than a first preset frequency domain gap;
the first resource and the second resource are in different time units; or
the first resource and the second resource are in different frequency domain units.

Optionally, the discarding at least one of the first sidelink information or the first target information includes:
discarding the first sidelink information and the first target information; or
discarding a part of the first sidelink information and the first target information based on a first target parameter, where the first target parameter includes at least one of: a first preset priority relationship, a transmission priority, a transmission requirement, transmission quality of service QoS, or a transmission data volume.

Optionally, the transmission module is configured to:
in a case that the first sidelink information and the first target information meet a preset multiplexing condition, transmit the first sidelink information and the first target information on the target resource.

Optionally, the preset multiplexing condition includes at least one of:
a third resource and a fourth resource overlap;
a time interval between the third resource and the fourth resource is less than or equal to a second preset time interval;
a frequency domain gap between the third resource and the fourth resource is less than or equal to a second preset frequency domain gap;
the third resource and the fourth resource are in a same time unit;
the third resource and the fourth resource are in a same time unit, and a total quantity of transmission resources of the third resource and the fourth resource in the time unit is greater than a first threshold;
the third resource and the fourth resource are in a same frequency domain unit;
the third resource and the fourth resource are in a same frequency domain unit, and a total quantity of transmission resources of the third resource and the fourth resource in the frequency domain unit is greater than a second threshold;
the third resource and the fourth resource are in a same time unit, and both the first sidelink information and the first target information include HARQ-ACK information;
the third resource and the fourth resource are in a same time unit, and both the third resource and the fourth resource include a long format physical uplink control channel resource; or
information types of at least a part of the first sidelink information and the first target information are different, where
the third resource is a transmission resource used for the first sidelink information, and the fourth resource is a transmission resource used for the first target information. Optionally, the target resource includes one of the following:
a transmission resource used to transmit the first sidelink information and the first target information through multiplexing;
a transmission resource indicated by the latest received scheduling signaling;
a transmission resource closest to a target moment, where the target moment is a moment at which the first sidelink information and the first target information are transmitted through multiplexing;
a transmission resource used for the first sidelink information;
a transmission resource determined based on at least one of the first sidelink information or the first target information; and
a transmission resource determined based on at least one of a resource type of a transmission resource used for the first sidelink information or a resource type of a transmission resource used for the first target information.

Optionally, the target resource is a transmission resource determined based on an information type of at least one of the first sidelink information or the first target information.

Optionally, the target resource includes a transmission resource selected based on a data volume of the first sidelink information and the first target information.

Optionally, an amount of data that can be transmitted on the target resource is greater than or equal to a first data volume; and
the first data volume is a total data volume before the first sidelink information and the first target information are multiplexed, or a total data volume after the first sidelink information and the first target information are multiplexed.

Optionally, the target resource is a transmission resource corresponding to a smallest difference between an amount of data that can be transmitted and the first data volume in transmission resources for which an amount of data that can be transmitted is greater than or equal to a target data volume.

Optionally, the terminal device further includes:
a first discarding module, configured to discard a part of first information in a case that an amount of data that can be transmitted on the target resource is less than a second data volume, where
a data volume of the first information obtained after the part of information is discarded is less than the amount of data that can be transmitted on the target resource, and is closest to the amount of data that can be transmitted on the target resource, or a data volume of the first information obtained after the part of information is discarded is equal to the amount of data that can be transmitted on the target resource; the first information includes the first sidelink information before the multiplexing and the first sidelink information, or the first sidelink information after the multiplexing and the first sidelink information; and the second data volume is a data volume of the first information.

Optionally, the first discarding module is configured to:
discard a part of the first information based on a second target parameter in a case that the amount of data that can be transmitted on the target resource is less than the second data volume, where the second target parameter includes at least one of: a second preset priority relationship, a transmission priority, a transmission requirement, transmission quality of service QoS, or a transmission data volume.

Optionally, in a case that the first target information includes the uplink information, the second preset priority relationship includes at least one of:
a priority of a CSI second part of the uplink information is lower than a priority of a CSI report of the first sidelink information;
the priority of the CSI report of the first sidelink information is lower than a priority of a CSI first part of the uplink information; or
the priority of the CSI first part of the uplink information is lower than a priority of second information, where the second information includes at least one of HARQ-ACK information of the uplink information, HARQ-ACK information of the first sidelink information, an SR of the uplink information, or an SR in the first sidelink information.

Optionally, in a case that the first target information includes the uplink information, the second preset priority relationship includes at least one of:
a priority of a CSI report of the first sidelink information being lower than a priority of a CSI report of the uplink information;
the priority of the CSI report of the uplink information being lower than a priority of HARQ-ACK information of the first sidelink information;
the priority of the HARQ-ACK information of the first sidelink information being lower than a priority of HARQ-ACK information of the uplink information; or
a priority of an SR in the first sidelink information being lower than a priority of an SR of the uplink information.

Optionally, in a case that the first target information includes the uplink information, the second preset priority relationship includes one of the following:
a priority of a CSI report of the uplink information being lower than a priority of an aperiodic CSI report of the first sidelink information; and
a priority of the first sidelink information being lower than a priority of the uplink information.

Optionally, in a case that the first target information includes the second sidelink information, the second preset priority relationship includes one of the following:
a priority of CSI being lower than a priority of HARQ-ACK information; and
a priority of the first sidelink information being lower than a priority of the second sidelink information.

Optionally, the transmitting first sidelink information and first target information on a target resource includes:
transmitting first multiplexing information on the target resource, where
the first multiplexing information includes one of the following:
information obtained by performing a cascade operation or an AND operation on second target information and the third target information;
information obtained by separately cascading information of a first type in the second target information and the third target information and performing an AND operation on information of a second type in the second target information and the third target information; and
information obtained by cyclically shifting one of the second target information and the third target information based on a target cyclic shift amount, where the target cyclic shift amount is determined based on the other of the second target information and the third target information or based on the second target information and the third target information; and
the second target information includes at least a part of the first sidelink information, and the third target information includes at least a part of the first target information.

Optionally, the first multiplexing information includes one of the following:

information obtained by cascading the second target information and the third target information as a whole; and information obtained by cascading information of a same type in the second target information and the third target information, and cascading each obtained cascading result.

Optionally, the first multiplexing information includes:

information obtained by cascading the second target information and the third target information in a cascading sequence, where the cascading sequence is determined based on at least one of an information type of the second target information or an information type of the third target information, or is determined based on a resource type of the target resource.

Optionally, the first multiplexing information includes:

information obtained by performing an AND operation on information of a same type in the second target information and the third target information.

Optionally, in a case that the first sidelink information is transmitted on a fifth resource, each type of information in the first sidelink information is mapped to the fifth resource in a first mapping manner, where the first mapping manner is a mapping manner of any type of information in the uplink information; or in a case that the first sidelink information is transmitted on a fifth resource, third information in the first sidelink information is mapped to the fifth resource in a second mapping manner, where the second mapping manner is a mapping manner of information of the same type as the third information in the uplink information, and the third information is any type of information in the first sidelink information.

Optionally, in a case that the first sidelink information and the first target information are transmitted on the target resource, fourth information in second multiplexing information is mapped to the target resource in a third mapping manner, where the second multiplexing information includes the first sidelink information and the first target information, the third mapping manner is a mapping manner of information of the same type as the fourth information in the uplink information, and the fourth information is any type of information in the first sidelink information.

Optionally, in a case that the first sidelink information and the first target information are transmitted on the target resource, a mapping manner for mapping third multiplexing information to the target resource is related to a third target parameter, where the third multiplexing information includes the first sidelink information and the first target information, and the third target parameter includes at least one of:

a type of information transmitted on the target resource;

an information type of the first sidelink information and an information type of the first target information; or a transmission priority of the first sidelink information and a transmission priority of the first target information.

Optionally, the mapping manner includes at least one of the following parameters: a mapping sequence, a mapping resource amount, or a mapping location.

Optionally, a transmission resource used for the first sidelink information meets a resource restriction rule, and a transmission resource used for the first target information meets the resource restriction rule, where the resource restriction rule includes at least one of:

a maximum of N transmission resources are included in one slot, and N is an integer greater than 1;

if there is a plurality of transmission resources exist, there are a maximum of M long format physical transmission resources in the plurality of transmission resources, where the physical transmission resource includes a physical uplink control channel PUCCH or a physical sidelink feedback channel PSFCH, and M is a positive integer; or if there is a plurality of transmission resources, a maximum of O transmission resources in the plurality of transmission resources may be used to transmit HARQ-ACK information, and O is a positive integer.

Optionally, a sixth resource does not need to meet the resource restriction rule, and the sixth resource includes a transmission resource used for the first sidelink information and a transmission resource used for the first target information.

Optionally, target information of the first sidelink information is determined in one of the following manners:

determining the target information of the first sidelink information in a first manner, where the first manner includes at least one of: a configuration of the control node, a preconfiguration, a predefinition in a protocol, a negotiation between terminals, or an indication of a target terminal device; and the target terminal device is a terminal device other than the first terminal device; and determining a target bit based on the first sidelink information, where the target bit includes at least one of a check bit or a redundancy bit.

Optionally, a target bit of the first sidelink information is generated in the following manner:

separately generating the target bit for CSI and fifth information of the first sidelink information, where the fifth information is information in the first sidelink information other than the CSI; and generating a target bit for each type of information in the first sidelink information, where the target bit includes at least one of a check bit or a redundancy bit.

Optionally, in a case that the first sidelink information and the first target information are transmitted on the target transmission resource, a target bit of fourth multiplexing information is generated in one of the following manners:

generating the target bit for the fourth multiplexing information;

if the first target information includes the uplink information and the uplink information includes a CSI second part, separately generating target bits for the CSI second part of the uplink information and sixth information, or generating target bits for the CSI second part of the uplink information and the first sidelink information, and generating a target bit for seventh information, where the sixth information is information in the fourth multiplexing information other than the CSI second part of the uplink information, and the seventh information is information in the fourth multiplexing information other than the CSI second part and the first sidelink information;

if the first target information includes the uplink information, separately generating target bits for first target CSI and eighth information, where the first target CSI includes at least one of CSI of the first sidelink information or CSI of the uplink information, and the eighth information is information in the fourth multiplexing information other than the first target CSI; and if the first target information includes the second sidelink information, separately generating target bits for second target CSI and ninth information, where the second target CSI includes at least one of CSI of the first sidelink information or CSI of the second sidelink information, and the ninth information is information in the fourth multiplexing information other than the second target CSI; and the target bit includes at least one of a check bit or a redundancy bit, and the fourth multiplexing information includes the first sidelink information and the first target information.

Optionally, the transmission module is configured to:

in a case that both the first sidelink information and the first target information include information of a first preset type, transmit the information of the first preset type in the first sidelink information and the information of the first preset type in the first target information on the target resource; and in a case that both the first sidelink information and the first target information include information of a second preset type, prohibit transmission of the information of the second preset type in the first sidelink information and the information of the second preset type in the first target information on the same transmission resource.

The terminal device 500 provided in this embodiment of the present disclosure can implement the processes implemented by the first terminal device in the foregoing method embodiment. To avoid repetition, details are not described herein again.

According to the terminal device 500 in this embodiment of the present disclosure, the transmission module 501 is configured to transmit first sidelink information and first target information on a target resource, or prohibit transmission of the first sidelink information and the first target information on a same transmission resource, where the first sidelink information is sidelink information corresponding to sidelink transmission between the first terminal device and a second terminal device, the first target information includes uplink information or second sidelink information, and the second sidelink information is sidelink information corresponding to sidelink transmission between the first terminal device and a control node. This provides a manner of transmitting first sidelink information and feedback information to a control node in a case that user equipment needs to simultaneously feed back, to the control node, the first sidelink information corresponding to sidelink transmission between the user equipment and another user equipment and the feedback information corresponding to transmission between the user equipment and the control node, thereby facilitating information transmission control.

Figure 6:
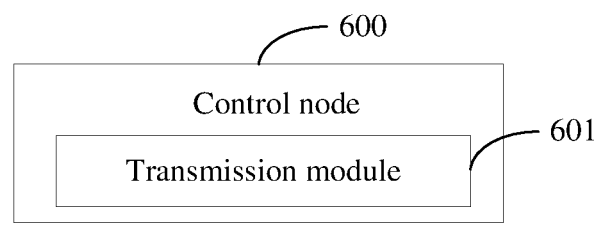
FIG. 6 is a structural diagram of a control node according to an embodiment of the present disclosure.

Referring to FIG. 6, FIG. 6 is a structural diagram of a control node according to an embodiment of the present disclosure. As shown in FIG. 6, a control node 600 includes:

a transmission module 601, configured to receive first sidelink information and first target information that are transmitted on a target resource, or separately configuring a first resource for the first sidelink information and a second resource for the first target information, where the first sidelink information is sidelink information corresponding to sidelink transmission between a first terminal device and a second terminal device, the first target information includes uplink control information, uplink information, or second sidelink information, and the second sidelink information is sidelink information corresponding to sidelink transmission between the first terminal device and the control node; and the first resource and the second resource meet a resource configuration rule, and the resource configuration rule includes at least a rule that the first resource and the second resource do not overlap.

Optionally, the resource configuration rule further includes at least one of:

a time interval between the first resource and the second resource is greater than a first preset time interval;

a frequency domain gap between the first resource and the second resource is greater than a first preset frequency domain gap;

the first resource and the second resource are in different time units; or the first resource and the second resource are in different frequency domain units.

Optionally, the target resource includes one of the following:

a transmission resource used to transmit the first sidelink information and the first target information through multiplexing;

a transmission resource indicated by the latest sent scheduling signaling;

a transmission resource closest to a target moment, where the target moment is a moment at which the first sidelink information and the first target information are transmitted through multiplexing;

a transmission resource used for the first sidelink information;

a transmission resource determined based on at least one of the first sidelink information or the first target information; or a transmission resource determined based on at least one of a resource type of a transmission resource used for the first sidelink information or a resource type of a transmission resource used for the first target information.

Optionally, the target resource is a transmission resource determined based on an information type of at least one of the first sidelink information or the first target information.

Optionally, the target resource includes a transmission resource selected based on a data volume of the first sidelink information and the first target information.

Optionally, an amount of data that can be transmitted on the target resource is greater than or equal to a first data volume; and the first data volume is a total data volume before the first sidelink information and the first target information are multiplexed, or a total data volume after the first sidelink information and the first target information are multiplexed.

Optionally, the target resource is a transmission resource corresponding to a smallest difference between an amount of data that can be transmitted and the first data volume in transmission resources for which an amount of data that can be transmitted is greater than or equal to a target data volume.

Optionally, the receiving first sidelink information and first target information that are transmitted on a target resource includes:

receiving first multiplexing information transmitted on the target resource, where the first multiplexing information includes one of the following:

information obtained by performing a cascade operation or an AND operation on second target information and the third target information;

information obtained by separately cascading information of a first type in the second target information and the third target information and performing an AND operation on information of a second type in the second target information and the third target information; and information obtained by cyclically shifting one of the second target information and the third target information based on a target cyclic shift amount, where the target cyclic shift amount is determined based on the other of the second target information and the third target information or based on the second target information and the third target information; and the second target information includes at least a part of the first sidelink information, and the third target information includes at least a part of the first target information.

Optionally, the first multiplexing information includes one of the following:

information obtained by cascading the second target information and the third target information as a whole; and information obtained by cascading information of a same type in the second target information and the third target information, and cascading each obtained cascading result.

Optionally, the first multiplexing information includes:

information obtained by cascading the second target information and the third target information in a cascading sequence, where the cascading sequence is determined based on at least one of an information type of the second target information or an information type of the third target information, or is determined based on a resource type of the target resource.

Optionally, the first multiplexing information includes:

information obtained by performing an AND operation on information of a same type in the second target information and the third target information.

Optionally, in a case that the first sidelink information is received on a fifth resource, each type of information in the first sidelink information is mapped to the fifth resource in a first mapping manner, where the first mapping manner is a mapping manner of any type of information in the uplink information; or in a case that the first sidelink information is received on a fifth resource, third information in the first sidelink information is mapped to the fifth resource in a second mapping manner, where the second mapping manner is a mapping manner of information of the same type as the third information in the uplink information, and the third information is any type of information in the first sidelink information.

Optionally, in a case that the first sidelink information and the first target information are received on the target resource, fourth information in second multiplexing information is mapped to the target resource in a third mapping manner, where the second multiplexing information includes the first sidelink information and the first target information, the third mapping manner is a mapping manner of information of the same type as the fourth information in the uplink information, and the fourth information is any type of information in the first sidelink information.

Optionally, in a case that the first sidelink information and the first target information are received on the target resource, a mapping manner for mapping third multiplexing information to the target resource is related to a third target parameter, where the third multiplexing information includes the first sidelink information and the first target information, and the third target parameter includes at least one of:

a type of information transmitted on the target resource;

an information type of the first sidelink information and an information type of the first target information; or a transmission priority of the first sidelink information and a transmission priority of the first target information.

Optionally, the mapping manner includes at least one of the following parameters: a mapping sequence, a mapping resource amount, or a mapping location.

The control node 600 provided in this embodiment of the present disclosure can implement the processes implemented by the control node in the foregoing method embodiment. To avoid repetition, details are not described herein again.

According to the control node 600 in this embodiment of this disclosure, the transmission module 601 is configured to receive first sidelink information and first target information that are transmitted on a target resource, or separately configuring a first resource for the first sidelink information and a second resource for the first target information, where the first sidelink information is sidelink information corresponding to sidelink transmission between a first terminal device and a second terminal device, the first target information includes uplink control information, uplink information, or second sidelink information, and the second sidelink information is sidelink information corresponding to sidelink transmission between the first terminal device and the control node; and the first resource and the second resource meet a resource configuration rule, and the resource configuration rule includes at least a rule that the first resource and the second resource do not overlap. This provides a manner of transmitting the first sidelink information and the first target information, thereby facilitating information transmission control.

Figure 7:
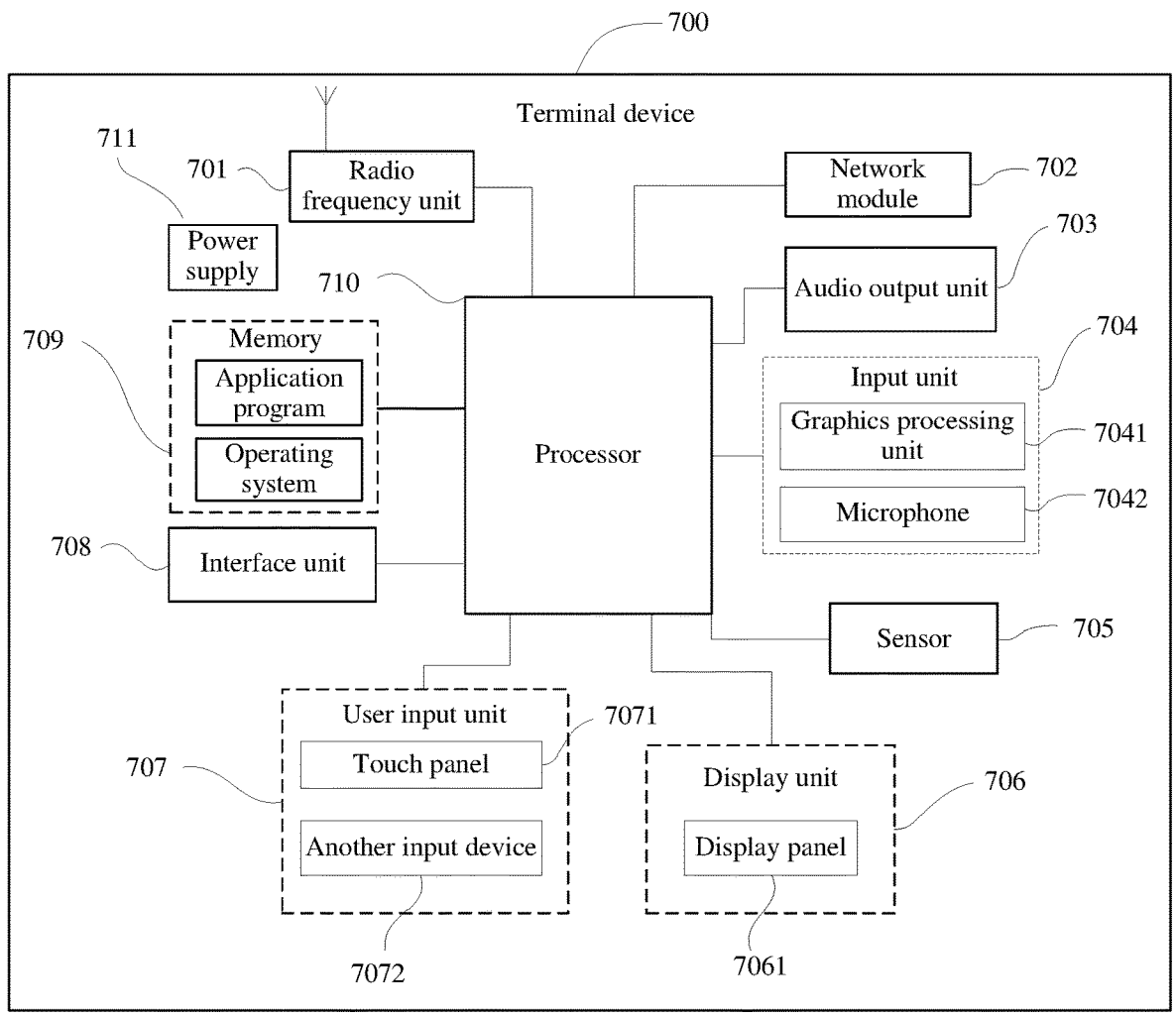
FIG. 7 is a structural diagram of a terminal device according to another embodiment of the present disclosure.

FIG. 7 is a structural diagram of another terminal device according to an embodiment of the present disclosure. Referring to FIG. 7, a terminal device 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. It can be understood by a person skilled in the art that, the terminal device structure shown in FIG. 7 does not constitute any limitation on the terminal device, and the terminal device may include more or fewer components than those shown in the figure, or combine some components, or have different component arrangements. In this embodiment of the present disclosure, the terminal device includes but is not limited to a mobile phone, a tablet computer, a notebook computer, a palmtop computer, an in-vehicle terminal, a wearable device, a pedometer, and the like.

The processor 710 is configured to: transmit first sidelink information and first target information on a target resource, or prohibit transmission of the first sidelink information and the first target information on a same transmission resource, where the first sidelink information is sidelink information corresponding to sidelink transmission between the first terminal device and a second terminal device, the first target information includes uplink information or second sidelink information, and the second sidelink information is sidelink information corresponding to sidelink transmission between the first terminal device and a control node.

It should be understood that, in this embodiment of the present disclosure, the radio frequency unit 701 may be configured to receive and send information or a signal in a call process. For example, after receiving downlink data from a base station, the radio frequency unit 701 sends the downlink data to the processor 710 for processing. In addition, the radio frequency unit 701 sends uplink data to the base station. Usually, the radio frequency unit 701 includes but is not limited to an antenna, at least one amplifier, a transceiver, a coupler, a low noise amplifier, a duplexer, and the like. In addition, the radio frequency unit 701 may communicate with a network and another device through a wireless communication system.

The terminal device provides wireless broadband Internet access for the user by using the network module 702, for example, helping the user to send and receive an e-mail, brows a web page, and access streaming media.

The audio output unit 703 may convert audio data received by the radio frequency unit 701 or the network module 702 or stored in the memory 709 into an audio signal and output the audio signal as a sound. In addition, the audio output unit 703 may further provide an audio output (for example, a call signal received voice, or a message received voice) related to a specific function implemented by the terminal device 700. The audio output unit 703 includes a speaker, a buzzer, a telephone receiver, and the like.

The input unit 704 is configured to receive an audio signal or a video signal. The input unit 704 may include a graphics processing unit (GPU) 7041 and a microphone 7042, and the graphics processing unit 7041 processes image data of a still picture or video obtained by an image capture apparatus (such as a camera) in a video capture mode or an image capture mode. A processed image frame may be displayed on the display unit 706. The image frame processed by the graphics processing unit 7041 may be stored in the memory 709 (or another storage medium) or sent by using the radio frequency unit 701 or the network module 702. The microphone 7042 may receive a sound and can process such sound into audio data. Processed audio data may be converted, in a call mode, into a format that can be sent to a mobile communication base station by using the radio frequency unit 701 for output.

The terminal device 700 further includes at least one sensor 705, such as an optical sensor, a motion sensor, and other sensors. For example, the light sensor includes an ambient light sensor and a proximity sensor. The ambient light sensor may adjust luminance of the display panel 7061 based on brightness of ambient light. The proximity sensor may turn off the display panel 7061 and/or backlight when the terminal device 700 moves to an ear. As a type of the motion sensor, an accelerometer sensor may detect an acceleration value in each direction (generally, three axes), and detect a value and a direction of gravity when the accelerometer sensor is static, and may be used in an application for recognizing a posture of the terminal device (such as screen switching between landscape and portrait modes, a related game, or magnetometer posture calibration), a function related to vibration recognition (such as a pedometer or a knock), and the like. The sensor 705 may further include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information entered by a user or information provided for a user. The display unit 706 may include a display panel 7061. The display panel 7061 may be configured in a form of a liquid crystal display (LCD), an organic light-emitting diode (OLED), or the like.

The user input unit 707 may be configured to receive input digit or character information, and generate a key signal input related to a user setting and function control of the terminal device. For example, the user input unit 707 includes a touch panel 7071 and another input device 7072. The touch panel 7071 is also referred to as a touchscreen, and may collect a touch operation performed by a user on or near the touch panel 7071 (such as an operation performed by a user on the touch panel 7071 or near the touch panel 7071 by using any proper object or accessory, such as a finger or a stylus). The touch panel 7071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 710, and receives and executes a command sent by the processor 710. In addition, the touch panel 7071 may be of a resistive type, a capacitive type, an infrared type, a surface acoustic wave type, or the like. The user input unit 707 may include the another input device 7072 in addition to the touch panel 7071. The another input device 7072 may include but is not limited to a physical keyboard, a functional button (such as a volume control button or a power on/off button), a trackball, a mouse, and a joystick. Details are not described herein.

Optionally, the touch panel 7071 may cover the display panel 7061. When detecting the touch operation on or near the touch panel 7071, the touch panel 7071 transmits the touch operation to the processor 710 to determine a type of a touch event, and then the processor 710 provides corresponding visual output on the display panel 7061 based on the type of the touch event. In FIG. 7, although the touch panel 7071 and the display panel 7061 are used as two independent parts to implement input and output functions of the terminal device, in some embodiments, the touch panel 7071 and the display panel 7061 may be integrated to implement the input and output functions of the terminal device. This is not specifically limited herein.

The interface unit 708 is an interface for connecting an external apparatus with the terminal device 700. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 708 may be configured to receive input (for example, data information and power) from an external apparatus and transmit the received input to one or more elements in the terminal device 700 or may be configured to transmit data between the terminal device 700 and an external apparatus.

The memory 709 may be configured to store a software program and various data. The memory 709 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 709 may include a high-speed random access memory, and may further include a nonvolatile memory, for example, at least one magnetic disk storage device, a flash storage device, or another volatile solid-state storage device.

The processor 710 is a control center of the terminal device, is connected to each part of the entire terminal device by using various interfaces and lines, and performs various functions of the terminal device and data processing by running or executing the software program and/or the module that are/is stored in the memory 709 and invoking data stored in the memory 709, to perform overall monitoring on the terminal device. The processor 710 may include one or more processing units. Optionally, an application processor and a modem processor may be integrated into the processor 710. The application processor mainly processes an operating system, a user interface, an application program, and the like. The modem processor mainly processes wireless communications. It can be understood that, alternatively, the modem processor may not be integrated into the processor 710.

The terminal device 700 may further include the power supply 711 (such as a battery) that supplies power to each component. Optionally, the power supply 711 may be logically connected to the processor 710 by using a power supply management system, so as to implement functions such as charging and discharging management, and power consumption management by using the power supply management system.

In addition, the terminal device 700 includes some function modules not shown, and details are not described herein.

Optionally, an embodiment of the present disclosure further provides a terminal device, including a processor 710, a memory 709, and a computer program that is stored in the memory 709 and that can run on the processor 710. When the computer program is executed by the processor 710, the processes of the foregoing information transmission method embodiment are implemented and a same technical effect can be achieved. To avoid repetition, details are not described herein again.

Figure 8:
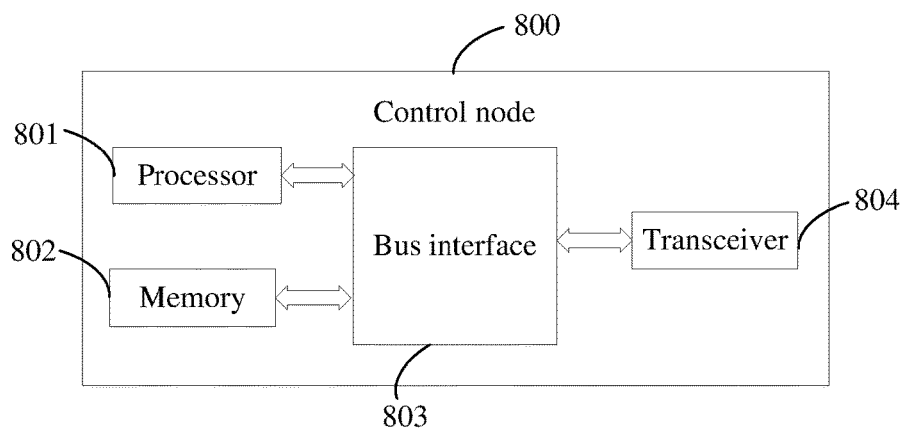
FIG. 8 is a structural diagram of a control node according to another embodiment of the present disclosure.

Referring to FIG. 8, FIG. 8 is a structural diagram of a control node according to another embodiment of the present disclosure. As shown in FIG. 8, a control node 800 includes a processor 801, a memory 802, a bus interface 803, and a transceiver 804, where the processor 801, the memory 802, and the transceiver 804 are all connected to the bus interface 803.

In this embodiment of the present disclosure, the control node 800 further includes a computer program that is stored in the memory 802 and executable on the processor 801.

In this embodiment of the present disclosure, the transceiver 804 is configured to:
receive first sidelink information and first target information that are transmitted on a target resource, or separately configuring a first resource for the first sidelink information and a second resource for the first target information, where
the first sidelink information is sidelink information corresponding to sidelink transmission between a first terminal device and a second terminal device, the first target information includes uplink control information, uplink information, or second sidelink information, and the second sidelink information is sidelink information corresponding to sidelink transmission between the first terminal device and the control node; and
the first resource and the second resource meet a resource configuration rule, and the resource configuration rule includes at least a rule that the first resource and the second resource do not overlap.

Optionally, an embodiment of the present disclosure further provides a control node, including a processor 801, a memory 802, and a computer program that is stored in the memory 802 and executable on the processor 801. When the computer program is executed by the processor 801, the processes of the foregoing information transmission method embodiment are implemented and a same technical effect can be achieved. To avoid repetition, details are not described herein again.

An embodiment of the present disclosure further provides a non-transitory computer-readable storage medium. The non-transitory computer-readable storage medium stores a computer program, and when the computer program is executed by a processor, the processes of the foregoing information transmission method embodiment are implemented and a same technical effect can be achieved. To avoid repetition, details are not described herein again. The non-transitory computer-readable storage medium includes a read-only memory (ROM), a random access memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. An information transmission method, applied to a first terminal device and comprising:
prohibiting transmission of first sidelink information and first target information on a same transmission resource, wherein the first sidelink information is hybrid automatic repeat request acknowledgement (HARQ-ACK) information corresponding to sidelink transmission between the first terminal device and a second terminal device reported to a control node, the first target information comprises uplink information.

2. The method according to claim 1, wherein the prohibiting transmission of the first sidelink information and the first target information on a same transmission resource comprises at least one of:
   transmitting the first sidelink information on a first resource and transmitting the first target information on a second resource in a case that the first resource and the second resource meet a resource configuration rule; or
   discarding at least one of the first sidelink information or the first target information in a case that a first resource and a second resource do not meet the resource configuration rule, wherein
   the first resource is a transmission resource used for the first sidelink information, the second resource is a transmission resource used for the first target information, and the resource configuration rule comprises at least a rule that the first resource and the second resource do not overlap.

3. The method according to claim 2, wherein the discarding at least one of the first sidelink information or the first target information in a case that a first resource and a second resource do not meet a resource configuration rule comprises:
   in a case that the first resource and the second resource do not meet the resource configuration rule, discarding the first sidelink information, wherein the uplink information comprises random access information.

4. The method according to claim 2, wherein the resource configuration rule further comprises at least one of:
   a time interval between the first resource and the second resource is greater than a first preset time interval;
   a frequency domain gap between the first resource and the second resource is greater than a first preset frequency domain gap;
   the first resource and the second resource are in different time units; or
   the first resource and the second resource are in different frequency domain units.

5. The method according to claim 2, wherein the discarding at least one of the first sidelink information or the first target information comprises:
   discarding the first sidelink information and the first target information; or
   discarding a part of the first sidelink information and the first target information based on a first target parameter, wherein the first target parameter comprises at least one of: a first preset priority relationship, a transmission priority relationship, a transmission requirement, transmission quality of service (QOS), or a transmission data volume.

6. The method according to claim 5, wherein the discarding a part of the first sidelink information and the first target information based on a first target parameter comprises:
   if the first target parameter comprises the transmission priority relationship, discarding information corresponding to transmission with a low transmission priority.

7. The method according to claim 1, wherein in a case that the first sidelink information is transmitted on a fifth resource, each type of information in the first sidelink information is mapped to the fifth resource in a first mapping manner, wherein the first mapping manner is a mapping manner of any type of information in the uplink information; or
   in a case that the first sidelink information is transmitted on a fifth resource, third information in the first sidelink information is mapped to the fifth resource in a second mapping manner, wherein the second mapping manner is a mapping manner of information of the same type as the third information in the uplink information, and the third information is any type of information in the first sidelink information.

8. The method according to claim 1, wherein the uplink information comprises at least one of the following: Uu HARQ-ACK information, channel state information (CSI), or a scheduling request (SR).

9. The method according to claim 1, wherein a transmission resource used for the first sidelink information meets a resource restriction rule, and a transmission resource used for the first target information meets the resource restriction rule, wherein
   the resource restriction rule comprises at least one of following:
   a maximum of N transmission resources are comprised in one slot, and N is an integer greater than 1;
   if there is a plurality of transmission resources exist, there are a maximum of M long format physical transmission resources in the plurality of transmission resources, wherein the physical transmission resource comprises a physical uplink control channel (PUCCH) or a physical sidelink feedback channel (PSFCH), and M is a positive integer; and
   if there is a plurality of transmission resources, a maximum of O transmission resources in the plurality of transmission resources may be used to transmit HARQ-ACK information, and O is a positive integer.

10. The method according to claim 9, wherein a sixth resource does not need to meet the resource restriction rule, and the sixth resource comprises a transmission resource used for the first sidelink information and a transmission resource used for the first target information.

11. The method according to claim 1, wherein target information of the first sidelink information is determined in one of following manners:
    determining the target information of the first sidelink information in a first manner, wherein the first manner comprises at least one of following: a configuration of the control node, a preconfiguration, a predefinition in a protocol, a negotiation between terminals, and an indication of a target terminal device; and the target terminal device is a terminal device other than the first terminal device; and
    determining a target bit based on the first sidelink information, wherein
    the target bit comprises at least one of a check bit and a redundancy bit.

12. The method according to claim 1, wherein a target bit of the first sidelink information is generated in following manner:
    separately generating the target bit for CSI and fifth information of the first sidelink information, wherein the fifth information is information in the first sidelink information other than the CSI; and
    generating a target bit for each type of information in the first sidelink information, wherein the target bit comprises at least one of a check bit and a redundancy bit.

13. An information transmission method, applied to a control node and comprising:
- separately configuring a first resource for first sidelink information and a second resource for first target information, wherein
- the first sidelink information is hybrid automatic repeat request acknowledgement (HARQ-ACK) information corresponding to sidelink transmission between a first terminal device and a second terminal device reported to the control node, the first target information comprises uplink information; and
- the first resource and the second resource meet a resource configuration rule, and the resource configuration rule comprises at least a rule that the first resource and the second resource do not overlap.

14. The method according to claim 13, wherein the resource configuration rule further comprises at least one of:
- a time interval between the first resource and the second resource is greater than a first preset time interval;
- a frequency domain gap between the first resource and the second resource is greater than a first preset frequency domain gap;
- the first resource and the second resource are in different time units; or
- the first resource and the second resource are in different frequency domain units.

15. The method according to claim 13, wherein the uplink information comprises at least one of the following: Uu HARQ-ACK information, channel state information (CSI), or a scheduling request (SR).

16. A terminal device, comprising a processor, a memory, and a computer program that is stored in the memory and executable on the processor, wherein the computer program, when executed by the processor, causes the terminal device to perform:
- prohibiting transmission of first sidelink information and first target information on a same transmission resource, wherein
- the first sidelink information is hybrid automatic repeat request acknowledgement (HARQ-ACK) information corresponding to sidelink transmission between a first terminal device and a second terminal device reported to a control node, the first target information comprises uplink information.

17. The terminal device according to claim 16, wherein the uplink information comprises at least one of the following: Uu HARQ-ACK information, channel state information (CSI), or a scheduling request (SR).

18. The terminal device according to claim 16, wherein the computer program, when executed by the processor, causes the terminal device to perform at least one of:
- transmitting the first sidelink information on a first resource and transmitting the first target information on a second resource in a case that the first resource and the second resource meet a resource configuration rule; or
- discarding at least one of the first sidelink information or the first target information in a case that a first resource and a second resource do not meet the resource configuration rule, wherein
- the first resource is a transmission resource used for the first sidelink information, the second resource is a transmission resource used for the first target information, and the resource configuration rule comprises at least a rule that the first resource and the second resource do not overlap.

19. The terminal device according to claim 18, wherein the computer program, when executed by the processor, causes the terminal device to perform:
- in a case that the first resource and the second resource do not meet the resource configuration rule, discarding the first sidelink information, wherein the uplink information comprises random access information.

20. The terminal device according to claim 18, wherein the resource configuration rule further comprises at least one of:
- a time interval between the first resource and the second resource is greater than a first preset time interval;
- a frequency domain gap between the first resource and the second resource is greater than a first preset frequency domain gap;
- the first resource and the second resource are in different time units; or
- the first resource and the second resource are in different frequency domain units.

* * * * *